(12) United States Patent
Kubota et al.

(10) Patent No.: US 8,547,503 B2
(45) Date of Patent: Oct. 1, 2013

(54) LIQUID CRYSTAL DISPLAY DEVICE HAVING A PIXEL ELECTRODE LAYER POSITIONED BETWEEN FIRST AND SECOND COMMON ELECTRODE LAYERS

(75) Inventors: Daisuke Kubota, Isehara (JP); Akio Yamashita, Atsugi (JP); Shuji Fukai, Atsugi (JP); Yoshiharu Hirakata, Ebina (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 195 days.

(21) Appl. No.: 13/105,346

(22) Filed: May 11, 2011

(65) Prior Publication Data

US 2011/0285940 A1 Nov. 24, 2011

(30) Foreign Application Priority Data

May 20, 2010 (JP) ................................ 2010-116014

(51) Int. Cl.
*G02F 1/1333* (2006.01)
*G02F 1/1335* (2006.01)
*G02F 1/1343* (2006.01)

(52) U.S. Cl.
USPC .............................. 349/86; 349/113; 349/138

(58) Field of Classification Search
USPC ................. 349/38, 39, 86, 113, 138
See application file for complete search history.

(56) References Cited

U.S. PATENT DOCUMENTS

| 6,219,113 B1 | 4/2001 | Takahara |
| 6,628,355 B1 | 9/2003 | Takahara |
| 7,847,904 B2 | 12/2010 | Kimura |
| 2002/0018278 A1* | 2/2002 | Sato .............................. 359/245 |
| 2009/0153781 A1* | 6/2009 | Otani et al. ..................... 349/74 |

FOREIGN PATENT DOCUMENTS

JP 11-024102 A 1/1999

OTHER PUBLICATIONS

Minoura.K et al., "p. 149: Super Reflective Color LCDs Being Able to Display Moving Images without Polarizers,", SID Digest '06 : SID International Symposium Digest of Technical Papers, Jun. 6, 2006, vol. 37, No. 1, pp. 769-772.

* cited by examiner

*Primary Examiner* — Michael Caley
(74) *Attorney, Agent, or Firm* — Eric J. Robinson; Robinson Intellectual Property Law Office, P.C.

(57) ABSTRACT

By providing a pixel electrode layer in a center of a liquid crystal layer sandwiched between a first common electrode layer and a second common electrode layer, a structure in which the following two optical elements are stacked can be obtained: a first liquid crystal element including the first common electrode layer, the liquid crystal layer, and the pixel electrode layer; and a second liquid crystal element including the pixel electrode layer, the liquid crystal layer, and the second common electrode layer.

15 Claims, 17 Drawing Sheets

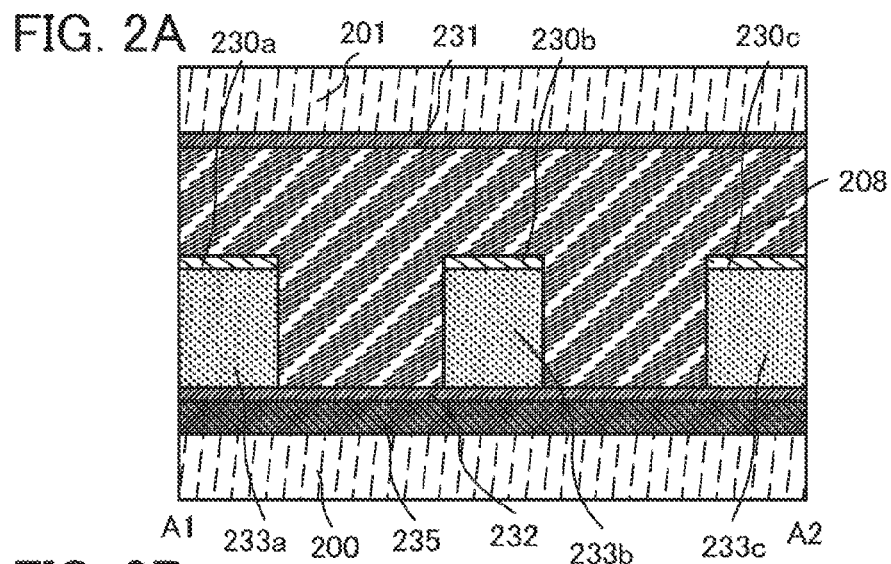
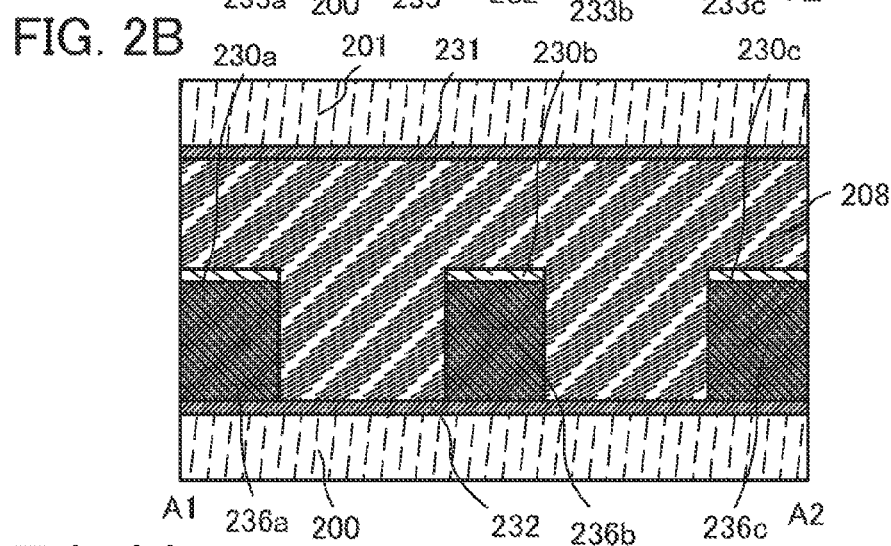
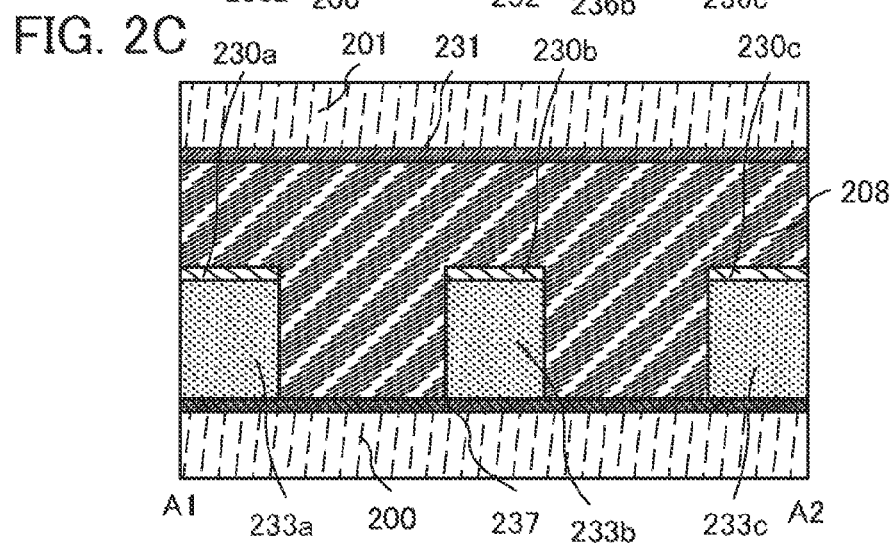

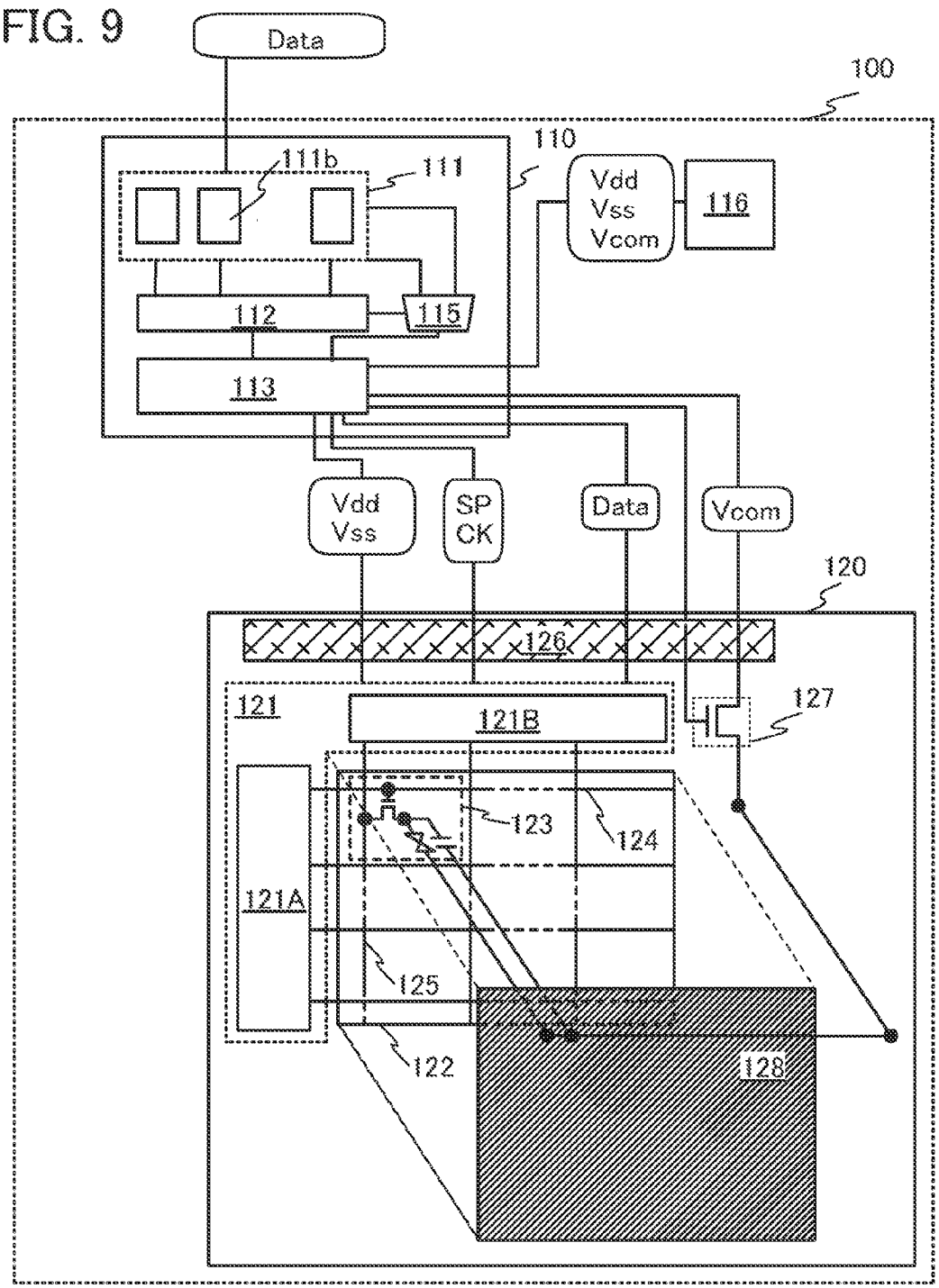

LIQUID CRYSTAL DISPLAY DEVICE HAVING A PIXEL ELECTRODE LAYER POSITIONED BETWEEN FIRST AND SECOND COMMON ELECTRODE LAYERS

BACKGROUND OF THE INVENTION

1. Field of the Invention

The present invention relates to a liquid crystal display device and a method for manufacturing the liquid crystal display device.

2. Description of the Related Art

As a display device which is thin and lightweight (a so-called flat panel display), a liquid crystal display device including a liquid crystal element, a light-emitting device including a self light-emitting element, a field emission display (an FED), and the like have been competitively developed.

In addition, since many optical members such as a polarizing plate and a backlight are used in a liquid crystal display device, there are problems with the liquid crystal display device in that, for example, cost or power consumption needs to be reduced.

As a measure against the above problems, a liquid crystal display device where neither a polarizing plate nor a backlight is necessarily provided and polymer dispersed liquid crystal is used, in which display is performed by utilizing light scattered by liquid crystals has been researched (e.g., see Non-Patent Document 1).

REFERENCE

Non-Patent Document

[Non-Patent Document 1] M. Minoura et al., SID 06 DIGEST, pp. 769-772

SUMMARY OF THE INVENTION

An object is to reduce power consumption of a liquid crystal display device in which display is performed by utilizing light scattered by liquid crystals.

Another object is to provide a liquid crystal display device having higher visibility and image quality.

Polymer dispersed liquid crystal (PDLC) or polymer network liquid crystal (PNLC) is used for a liquid crystal layer so that white display (light display) is performed by utilizing light scattered by liquid crystals. The liquid crystal layer has a structure in which liquid crystal grains are dispersed in a polymer layer forming a polymer network.

A first common electrode layer and a second common electrode layer to which the same fixed potential is supplied are provided so that the liquid crystal layer is sandwiched therebetween, and a pixel electrode layer is provided in the liquid crystal layer between the first common electrode layer and the second common electrode layer. When the pixel electrode layer is provided in the center of the liquid crystal layer, the first common electrode layer, the pixel electrode layer, and the second common electrode layer are stacked with the liquid crystal layer positioned between the pixel electrode layer and the first common electrode layer and between the pixel electrode layer and the second common electrode layer.

In the liquid crystal layer, in the case of applying no voltage between the pixel electrode layer and the common electrode layer (also referred to as an off state), the liquid crystal grains dispersed in the polymer layer are oriented in a random manner to cause a difference between the refractive index of the polymer and the refractive index of the liquid crystal molecule, and incident light is thus scattered by the liquid crystal grains to make the liquid crystal layer opaque and clouded. Therefore, display that can be recognized from the viewing side is also white display.

On the other hand, in the case of applying voltage between the pixel electrode layer and the common electrode layer (also referred to as an on state), an electric field is generated in the liquid crystal layer, and the liquid crystal molecules in the liquid crystal grains are oriented in the direction of the electric field such that the refractive index of the polymer corresponds with the refractive index in the short axis of the liquid crystal molecule. Thus, incident light is transmitted through the liquid crystal layer without being scattered by the liquid crystal grains. Therefore, the liquid crystal layer transmits light and is in a transparent state. In the case where the liquid crystal layer is in a light-transmitting state, display that can be recognized from the viewing side depends on materials provided on the front and back sides of the liquid crystal layer. Therefore, when a black layer or a coloring layer is provided behind the liquid crystal layer (on a side opposite to the viewing side), the black layer or the coloring layer can be seen. Accordingly, a pixel displays black on a display surface that can be recognized on the viewing side; thus, black display (dark display) can be performed. Note that in this specification, a coloring layer refers to a layer exhibiting a color other than black and white.

The distance between the pixel electrode layer and the first common electrode layer and the distance between the pixel electrode layer and the second common electrode layer, which are stacked with the liquid crystal layer positioned therebetween, are set to distances at which liquid crystals in the liquid crystal layer positioned between the pixel electrode layer and the first common electrode layer and between the pixel electrode layer and the second common electrode layer can respond when appropriate voltage is applied between the pixel electrode layer, and the first common electrode layer and the second common electrode layer. The voltage to be applied is controlled as appropriate in accordance with the distances.

A structure body is provided over one of the common electrode layers (in this specification, the first common electrode layer provided over an element substrate) so as to project into the liquid crystal layer and the pixel electrode layer is provided over the structure body, whereby the pixel electrode layer can be positioned in the liquid crystal layer. The position and shape of the pixel electrode layer in the liquid crystal layer can be controlled by selecting the thickness and shape of the structure body.

In order to generate highly uniform electric fields in the liquid crystal layer, the pixel electrode layer is preferably positioned in the liquid crystal layer so that the same interval (distance) is provided between the pixel electrode layer and the first common electrode layer and between the pixel electrode layer and the second common electrode layer. Therefore, it is preferable that the thickness of the structure body formed under the pixel electrode layer be approximately half of the maximum thickness of the liquid crystal layer (also referred to as a cell gap of a liquid crystal display device).

The first common electrode layer and the second common electrode layer between which the liquid crystal layer is sandwiched have planar and flat shapes. Further, each of the first common electrode layer and the second common electrode layer with which common voltage is applied to all pixels can be formed as a continuous plate-shaped conductive film in a pixel region including a plurality of pixels.

In contrast, the pixel electrode layer and the structure body do not have plate shapes but have shapes with various opening patterns (slits) including a bent portion or a branching comb-like shape, and openings provided in the pixel electrode layer and the structure body can be filled with the liquid crystal layer. Note that the first common electrode layer is exposed in the openings of the pixel electrode layer and the structure body.

In the liquid crystal display device of this specification, white display is performed in such a manner that incident light is scattered by liquid crystal grains dispersed and orientated in a random manner in the liquid crystal layer. The liquid crystal layer preferably has high light scattering intensity to perform favorable white display close to a plane of paper. The light scattering intensity of the liquid crystal layer is enhanced as the number of times of collision between light and the liquid crystal grains dispersed in the liquid crystal layer is increased; therefore, it is effective to enhance the light scattering intensity of the liquid crystal layer by increasing the thickness of the liquid crystal layer and increasing the number of liquid crystal grains included in the liquid crystal layer so that the number of times of collision between the light entering the liquid crystal layer and the liquid crystal grains is increased.

However, when the thickness of the liquid crystal layer is increased, higher driving voltage is needed to make the liquid crystal molecules respond and to drive a liquid crystal element; as a result, power consumption is increased. Moreover, when the driving voltage of the liquid crystal element in which the thickness of the liquid crystal layer is increased is lowered, the liquid crystal molecules respond insufficiently in the liquid crystal element in an on state and light transmittance is decreased; accordingly, the contrast of the liquid crystal display device is decreased.

By providing the pixel electrode layer in the center of the liquid crystal layer sandwiched between the first common electrode layer and the second common electrode layer, a structure in which the following two optical elements are stacked can be obtained: a first liquid crystal element including the first common electrode layer, the liquid crystal layer, and the pixel electrode layer; and a second liquid crystal element including the pixel electrode layer, the liquid crystal layer, and the second common electrode layer.

In the liquid crystal layer, the liquid crystal layer positioned between the first common electrode layer and the pixel electrode layer is controlled by an electric field generated between the first common electrode layer and the pixel electrode layer. The liquid crystal layer positioned between the pixel electrode layer and the second common electrode layer is controlled by an electric field generated between the pixel electrode layer and the second common electrode layer. Since the thickness of the liquid crystal layer can be increased by stacking the first liquid crystal element and the second liquid crystal element, a high light scattering effect can be obtained and favorable white display can be performed. Further, the first liquid crystal element and the second liquid crystal element are parallel to each other in a circuit; thus, voltage for driving both the first liquid crystal element and the second liquid crystal element can be the same as voltage for driving one of the first liquid crystal element and the second liquid crystal element.

Therefore, even when the thickness of the liquid crystal layer is increased for favorable white display, the liquid crystal molecules can be made to respond without increase in the driving voltage of the liquid crystal elements. Consequently, in the liquid crystal display device, improvement in contrast ratio and reduction in power consumption can be achieved.

The structure body can be formed using an insulator including an insulating material (an organic material or an inorganic material). Typically, a visible light curable resin, an ultraviolet curable resin, or a thermosetting resin is preferably used. For example, an acrylic resin, an epoxy resin, an amine resin, or the like can be used. Note that the structure body may have a stacked-layer structure of plural thin films.

The structure body can have a columnar shape, a truncated conical or pyramidal shape with a flat top surface and a trapezoidal cross section, a conical or pyramidal shape with a rounded dome top, or the like. In this specification, the structure body is provided between the first common electrode layer and the pixel electrode layer so that the first common electrode layer and the pixel electrode layer are insulated from each other, and thus preferably has a shape which makes it difficult for the first common electrode layer and the pixel electrode layer to be in contact with each other. For example, a columnar structure body having an inverse tapered shape whose cross section is a trapezoid where the area of a plane in contact with the pixel electrode layer is larger than that of a plane in contact with the first common electrode layer, or the like is preferable.

When a material having a light-transmitting property with respect to visible light is used for the structure body, display using a black layer (or a coloring layer) provided under the structure body (on the side opposite to the viewing side) is not interrupted in the case where the liquid crystal layer is in a transparent state. The structure body may be formed using a material colored in black or another color and may be used as a black layer or a coloring layer.

Further, the structure body may be a continuous film having a plurality of projections.

The pixel electrode layer may be formed using a reflective conductive layer or a light-transmitting conductive layer. In performing white display, when the pixel electrode layer has reflectivity, incident light is reflected to the liquid crystal layer side by the pixel electrode layer even if the light passes through the liquid crystal layer without being scattered; thus, the light can be efficiently scattered in the liquid crystal layer and visibility of white display can be improved. On the other hand, when the pixel electrode layer has a light-transmitting property, display using a black layer (or a coloring layer) provided under the pixel electrode layer (on the side opposite to the viewing side) is not interrupted in the case where the liquid crystal layer is in a transparent state.

The second common electrode layer provided on the viewing side is formed using a light-transmitting conductive layer. The first common electrode layer provided on the side opposite to the viewing side may be formed using a light-transmitting conductive layer or may be formed using a conductive layer exhibiting black with the use of a black conductive material to function also as a black layer.

The coloring layer may be positioned so that visibility can be secured and color display can be performed in the case where the liquid crystal layer transmits light. The coloring layer is preferably provided under the pixel electrode layer or the first common electrode layer (on the side opposite to the viewing side). Alternatively, the structure body or an interlayer film provided under the first common electrode layer can also serve as a coloring layer.

The provision of the black layer as a coloring layer can provide a liquid crystal display device which produce black-and-white (monochrome) display. In addition, when a coloring layer of a chromatic color such as a red layer, a green layer, or a blue layer is used instead of the black layer, the chromatic color can be displayed. Therefore, the selection of multiple colors for the coloring layer can also provide a liquid crystal display device for full-color display.

One embodiment of a structure of the invention disclosed in this specification is a liquid crystal display device including a first substrate and a second substrate between which a liquid crystal layer including a polymer dispersed liquid crystal material is sandwiched; a plate-shaped first common electrode layer provided between the first substrate and the liquid crystal layer; a plate-shaped light-transmitting second common electrode layer provided between the second substrate and the liquid crystal layer; and a structure body and a pixel electrode layer that have an opening and are stacked between the first common electrode layer and the liquid crystal layer. In the liquid crystal layer, the pixel electrode layer is positioned between the first common electrode layer and the second common electrode layer by the structure body.

Another embodiment of a structure of the invention disclosed in this specification is a liquid crystal display device including a first substrate and a second substrate between which a liquid crystal layer including a polymer dispersed liquid crystal material is sandwiched; a plate-shaped light-transmitting first common electrode layer provided between the first substrate and the liquid crystal layer; a plate-shaped light-transmitting second common electrode layer provided between the second substrate and the liquid crystal layer; a structure body and a pixel electrode layer that have an opening and are stacked between the first common electrode layer and the liquid crystal layer; and a coloring layer provided between the first substrate and the first common electrode layer. In the liquid crystal layer, the pixel electrode layer is positioned between the first common electrode layer and the second common electrode layer by the structure body.

By providing the pixel electrode layer in the center of the liquid crystal layer sandwiched between the first common electrode layer and the second common electrode layer, a structure in which the following two optical elements are stacked can be obtained: a first liquid crystal element including the first common electrode layer, the liquid crystal layer, and the pixel electrode layer; and a second liquid crystal element including the pixel electrode layer, the liquid crystal layer, and the second common electrode layer.

Therefore, even when the thickness of the liquid crystal layer is increased for favorable white display, liquid crystal molecules can be made to respond without increase in the driving voltage of the liquid crystal elements. Consequently, in the liquid crystal display device, improvement in contrast ratio and reduction in power consumption can be achieved.

A liquid crystal display device having higher visibility and image quality can be provided.

BRIEF DESCRIPTION OF THE DRAWINGS

In the accompanying drawings:

FIGS. 2A to 2C illustrate embodiments of a liquid crystal display device;

FIG. 9 illustrates one embodiment of a liquid crystal display device;

DETAILED DESCRIPTION OF THE INVENTION

Figure 1A:
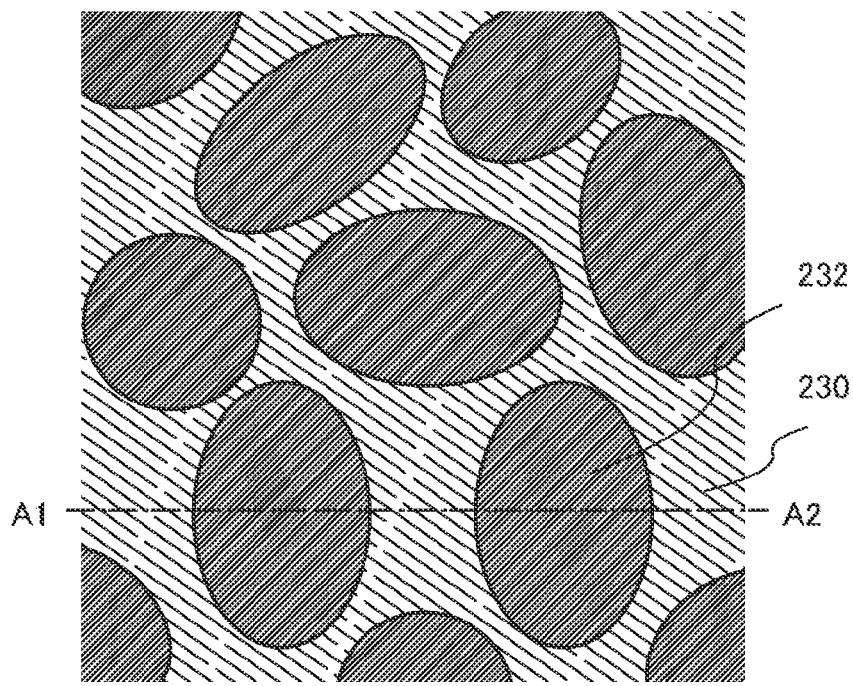
FIGS. 1A and 1B illustrate one embodiment of a liquid crystal display device.

Embodiments will be described in detail with reference to the drawings. Note that the invention disclosed in this specification is not limited to the following description, and it is easily understood by those skilled in the art that modes and details can be modified in a variety of ways without departing from the spirit and scope of the invention. Therefore, the invention is not construed as being limited to the description of the embodiments below. In the structures to be given below, the same portions or portions having similar functions are denoted by the same reference numerals in different drawings, and explanation thereof will not be repeated.

Note that the ordinal numbers such as "first," "second," and "third" in this specification are used for convenience and do not denote the order of steps and the stacking order of layers. In addition, the ordinal numbers in this specification do not denote particular names which specify the invention.

Embodiment 1

A liquid crystal display device which is one embodiment of a structure of the invention disclosed in this specification will be described with reference to FIGS. 1A and 1B, FIGS. 2A to 2C, and FIG. 3. FIG. 1A is a plan view of a liquid crystal display device, and FIG. 1B, FIGS. 2A to 2C, and FIG. 3 are cross-sectional views along line A1-A2 in FIG. 1A. Note that the plan view of FIG. 1A illustrates a first substrate 200 side and a liquid crystal layer 208, a second common electrode layer 231, and a second substrate 201 are omitted. In FIGS. 1A and 1B, FIGS. 2A to 2C, and FIG. 3, the viewing side is a second substrate 201 side of the liquid crystal layer 208, and the first substrate 200 side is a side opposite to the viewing side.

Figure 1B:
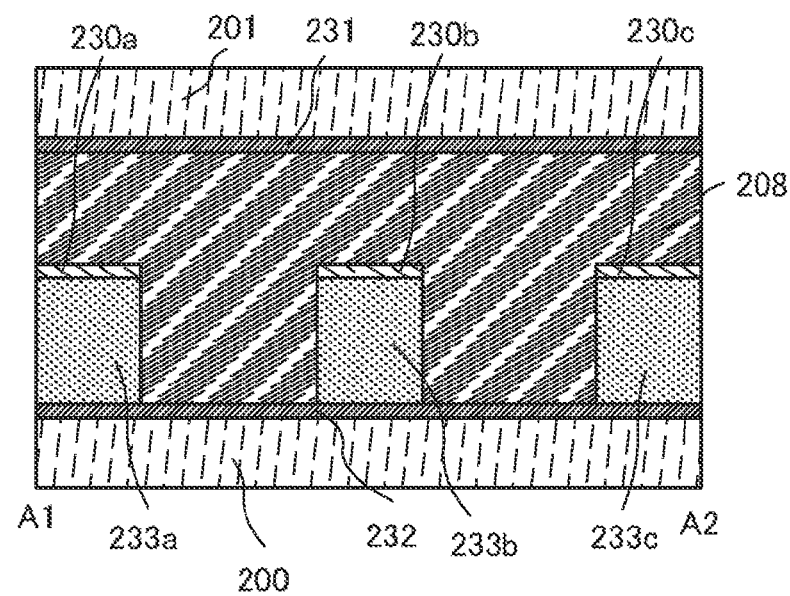

FIGS. 1A and 1B illustrate the liquid crystal display device in which the first substrate 200 provided with a first common electrode layer 232, a pixel electrode layer 230 (230a, 230b, and 230c), and a structure body 233 (233a, 233b, and 233c) and the second substrate 201 provided with the second common electrode layer 231 are arranged so as to face each other with the liquid crystal layer 208 sandwiched therebetween.

Note that the pixel electrode layer 230 in the plan view of FIG. 1A has a shape with an opening pattern, and thus is illustrated as a plurality of divided pixel electrode layers 230a, 230b, and 230c in the cross-sectional views of FIG. 1B, FIGS. 2A to 2C, and FIG. 3. Similarly, the structure body 233 (not shown in FIG. 1A) formed under the pixel electrode layer 230 in the plan view of FIG. 1A has a shape with an opening pattern, and thus is illustrated as a plurality of divided structure bodies 233a, 233b, and 233c in the cross-sectional views of FIG. 1B, FIGS. 2A to 2C, and FIG. 3. In this manner, a pixel electrode layer and a structure body with opening patterns in this specification are each illustrated as a continuous film in a plan view; in a cross-sectional view along line crossing the opening in the plan view, the pixel electrode layer and the structure body are illustrated as a plurality of divided pixel electrode layers or a plurality of divided structure bodies.

The first common electrode layer 232 and the second common electrode layer 231 to which the same fixed potential is supplied are provided so that the liquid crystal layer 208 is sandwiched therebetween, and the pixel electrode layers 230a, 230b, and 230c are provided in the liquid crystal layer 208 between the first common electrode layer 232 and the second common electrode layer 231. When the pixel electrode layers 230a, 230b, and 230c are provided in the center of the liquid crystal layer 208, the first common electrode layer 232, the pixel electrode layers 230a, 230b and 230c, and the second common electrode layer 231 are stacked with the liquid crystal layer 208 positioned between the pixel electrode layers 230a, 230b, and 230c and the first common electrode layer 232 and between the pixel electrode layers 230a, 230b, and 230c and the second common electrode layer 231.

The first common electrode layer 232 and the second common electrode layer 231 between which the liquid crystal layer 208 is sandwiched have planar and flat shapes. Further, each of the first common electrode layer 232 and the second common electrode layer 231 with which common voltage is applied to all pixels can be formed as a continuous plate-shaped conductive film in a pixel region including a plurality of pixels.

In contrast, the pixel electrode layer 230 and the structure body 233 do not have plate shapes but have shapes with various opening patterns (slits) including a bent portion or a branching comb-like shape, and openings provided in the pixel electrode layer 230 and the structure body 233 can be filled with the liquid crystal layer 208. Note that the first common electrode layer 232 is exposed in the openings of the pixel electrode layer 230 and the structure body 233.

FIGS. 16A to 16D illustrate examples of the first common electrode layer 232 (the same for the second common electrode layer 231) and examples of the pixel electrode layer 230. As illustrated in FIGS. 16A to 16D, first common electrode layers 232d to 232g and pixel electrode layers 230d to 230g are arranged so as to overlap with each other, and structure bodies are formed between the first common electrode layers 232d to 232g and the pixel electrode layers 230d to 230g.

Figure 16A:
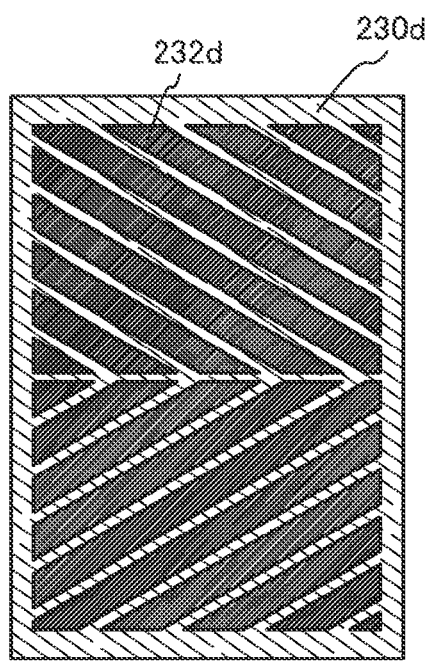
FIGS. 16A to 16D illustrate embodiments of a liquid crystal display device.
Figure 16B:
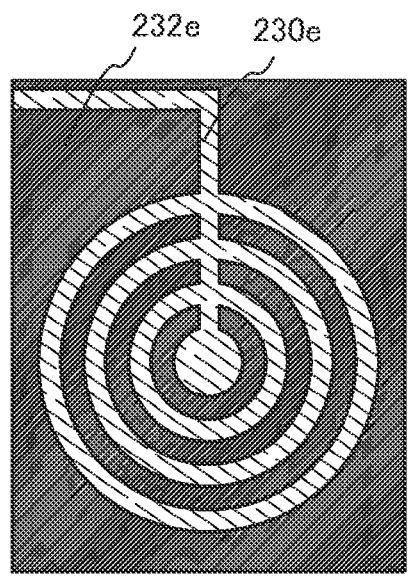
Figure 16C:
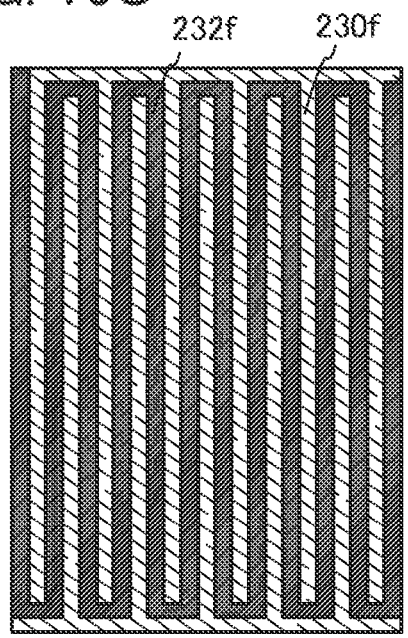
Figure 16D:
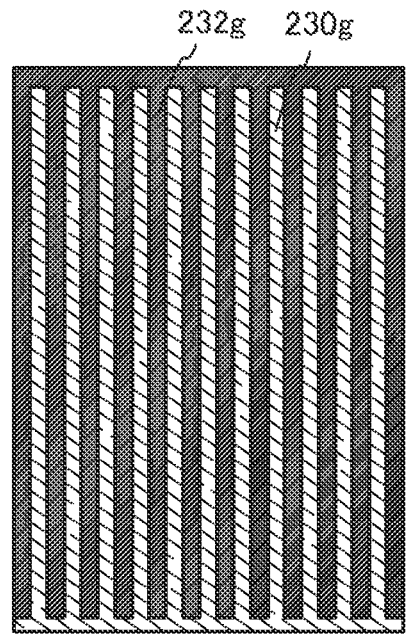

As illustrated in the top views of FIGS. 16A to 16D, the pixel electrode layers 230d to 230g formed to have various patterns are provided over the first common electrode layers 232d to 232g. In FIG. 16A, the pixel electrode layer 230d over the first common electrode layer 232d has a V-like shape. In FIG. 16B, the pixel electrode layer 230e over the first common electrode layer 232e has a concentric circular shape. In FIG. 16C, the pixel electrode layer 230f over the first common electrode layer 232f has a comb-like shape in which the electrodes are engaged with each other. In FIG. 16D, the pixel electrode layer 230g over the first common electrode layer 232g has a comb-like shape. Although not being illustrated, second common electrode layers 231d to 231g facing the first common electrode layers 232d to 232g are conductive layers having plate shapes similar to those of the first common electrode layers 232d to 232g.

Polymer dispersed liquid crystal (PDLC) or polymer network liquid crystal (PNLC) is used for the liquid crystal layer 208 so that white display (light display) is performed by utilizing light scattered by liquid crystals. The liquid crystal layer 208 has a structure in which liquid crystal grains are dispersed in a polymer layer forming a polymer network.

An operation principle of polymer dispersed liquid crystal will be described. In the liquid crystal layer 208, in the case of applying no voltage between the pixel electrode layers 230a, 230b, and 230c and the first common electrode layer 232 and between the pixel electrode layers 230a, 230b, and 230c and the second common electrode layer 231 (also referred to as an off state), the liquid crystal grains dispersed in the polymer layer are oriented in a random manner to cause a difference between the refractive index of the polymer and the refractive index of the liquid crystal molecule, and incident light is thus scattered by the liquid crystal grains to make the liquid crystal layer 208 opaque and clouded. Therefore, display that can be recognized from the viewing side is also white display.

On the other hand, in the case of applying voltage between the pixel electrode layers 230a, 230b, and 230c and the first common electrode layer 232 and between the pixel electrode layers 230a, 230b, and 230c and the second common electrode layer 231 (also referred to as an on state), an electric field is generated in the liquid crystal layer 208, and the liquid crystal molecules in the liquid crystal grains are oriented in the direction of the electric field such that the refractive index of the polymer corresponds with the refractive index in the short axis of the liquid crystal molecule. Thus, incident light is transmitted through the liquid crystal layer 208 without being scattered by the liquid crystal grains. Therefore, the liquid crystal layer 208 transmits light and is in a transparent state.

The distance between the pixel electrode layer 230 and the first common electrode layer 232 and the distance between the pixel electrode layer 230 and the second common electrode layer 231, which are stacked with the liquid crystal layer 208 positioned therebetween, are set to distances at which liquid crystals in the liquid crystal layer 208 positioned between the pixel electrode layer 230 and the first common electrode layer 232 and between the pixel electrode layer 230 and the second common electrode layer 231 can respond when appropriate voltage is applied between the pixel electrode layer 230, and the first common electrode layer 232 and the second common electrode layer 231. The voltage to be applied is controlled as appropriate in accordance with the distances.

The structure body 233 is provided over one of the common electrode layers (in this embodiment, the first common electrode layer 232 provided over the first substrate 200) so as to project into the liquid crystal layer 208 and the pixel electrode layer 230 is provided over the structure body 233, whereby the pixel electrode layer 230 can be positioned in the liquid crystal layer. The position and shape of the pixel electrode layer 230 in the liquid crystal layer 208 can be controlled by selecting the thickness and shape of the structure body 233.

In order to form highly uniform electric fields in the liquid crystal layer 208, the pixel electrode layer 230 is preferably positioned in the liquid crystal layer so that the same interval (distance) is provided between the pixel electrode layer 230 and the first common electrode layer 232 and between the pixel electrode layer 230 and the second common electrode layer 231. Therefore, it is preferable that the thickness of the structure body 233 formed under the pixel electrode layer 230 be approximately half of the maximum thickness of the liquid crystal layer 208 (also referred to as a cell gap of the liquid crystal display device).

In the liquid crystal display device which is one embodiment of a structure of the invention disclosed in this specification, white display is performed in such a manner that incident light is scattered by the liquid crystal grains dispersed and orientated in a random manner in the liquid crystal layer 208. The liquid crystal layer 208 preferably has high light scattering intensity to perform favorable white display close to a plane of paper. The light scattering intensity of the liquid crystal layer 208 is enhanced as the number of times of collision between light and the liquid crystal grains dispersed in the liquid crystal layer 208 is increased; therefore, it is effective to enhance the light scattering intensity of the liquid crystal layer 208 by increasing the thickness of the liquid crystal layer 208 and increasing the number of liquid crystal grains included in the liquid crystal layer 208 so that the number of times of collision between the light entering the liquid crystal layer 208 and the liquid crystal grains is increased.

However, when the thickness of the liquid crystal layer 208 is increased, higher driving voltage is needed to make the liquid crystal molecules respond and to drive a liquid crystal element; as a result, power consumption is increased. Moreover, when the driving voltage of the liquid crystal element in which the thickness of the liquid crystal layer 208 is increased is lowered, the liquid crystal molecules respond insufficiently in the liquid crystal element in an on state and light transmittance is decreased; accordingly, the contrast of the liquid crystal display device is decreased.

By providing the pixel electrode layer 230 in the center of the liquid crystal layer 208 sandwiched between the first common electrode layer 232 and the second common electrode layer 231, a structure in which the following two optical elements are stacked can be obtained: a first liquid crystal element including the first common electrode layer 232, the liquid crystal layer 208, and the pixel electrode layer 230; and a second liquid crystal element including the pixel electrode layer 230, the liquid crystal layer 208, and the second common electrode layer 231.

Figure 17A:
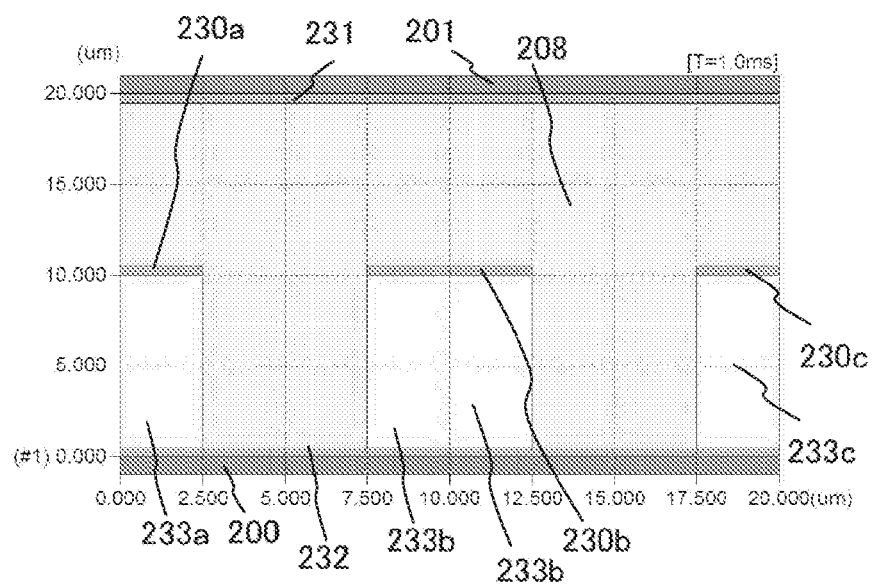
FIGS. 17A and 17B show calculation results of an electric field mode of a liquid crystal display device.
Figure 17B:
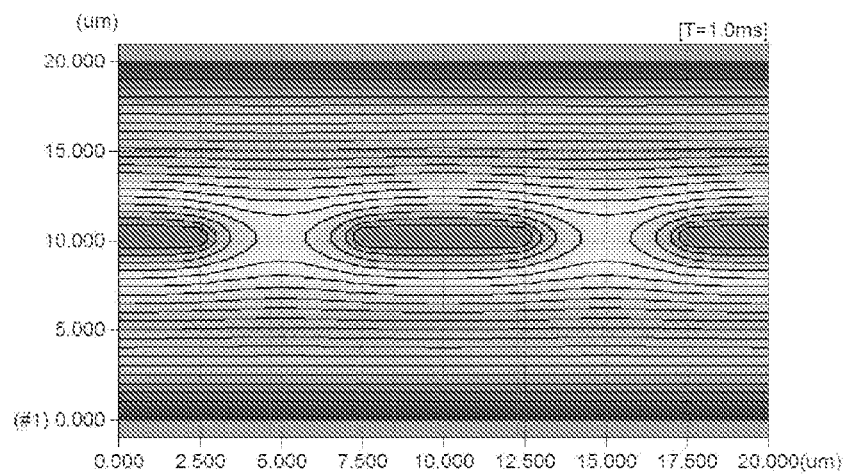

FIG. 17B shows results of calculating an electric field applied in a liquid crystal display device. The calculation was performed using LCD Master, 2s Bench manufactured by SHINTECH, Inc.

FIG. 17A shows a structure of the liquid crystal display device used for the calculation. The structure in FIG. 17A corresponds to that in FIG. 1B. An insulator with a dielectric of 4 was used as the structure bodies 233a, 233b, and 233c, and the cross-sectional widths thereof were each set to 5 μm. The structure bodies 233a, 233b, and 233c each have a thickness (height) of 10 μm. Here, the thicknesses (heights) of the structure bodies 233a, 233b, and 233c are each a maximum thickness (height) from a bottom surface (the first substrate 200).

In FIGS. 17A and 17B, the first common electrode layer 232 formed over the first substrate 200 and the second common electrode layer 231 formed on the second substrate 201 are arranged with the liquid crystal layer 208 sandwiched therebetween. Further, the structure bodies 233a, 233b, and 233c and the pixel electrode layers 230a, 230b, and 230c are stacked over the first common electrode layer 232. The thicknesses of the pixel electrode layers 230a, 230b, and 230c, the first common electrode layer 232, and the second common electrode layer 231 are each 0.5 μm. The distance between the first substrate 200 and the second substrate 201, which corresponds to the cell gap (the maximum thickness of the liquid crystal layer), is 20 μm.

FIG. 17B shows results of calculation performed on the structure in FIG. 17A. The calculation was performed under the following conditions: the first common electrode layer 232 and the second common electrode layer 231 were set at 0 V, and the pixel electrode layers 230a, 230b, and 230c were set at 10 V.

In FIG. 17B, a solid line represents an equipotential line, and the equipotential lines are formed parallel to surfaces of the first substrate 200 and the second substrate 201, between the first common electrode layer 232 and the pixel electrode layers 230a, 230b, and 230c and between the pixel electrode layers 230a, 230b, and 230c and the second common electrode layer 231.

Since an electric field is generated perpendicular to an equipotential line, it can be confirmed that an electric field is applied to the liquid crystal layer 208 in the direction perpendicular to the first substrate 200 and the second substrate 201 (in the longitudinal direction) as shown in FIG. 17B.

Thus, in the liquid crystal layer 208, the liquid crystal layer 208 positioned between the first common electrode layer 232 and the pixel electrode layer 230 is controlled by an electric field generated between the first common electrode layer 232 and the pixel electrode layer 230. The liquid crystal layer 208 positioned between the pixel electrode layer 230 and the second common electrode layer 231 is controlled by an electric field generated between the pixel electrode layer 230 and the second common electrode layer 231. Since the thickness of the liquid crystal layer 208 can be increased by stacking the first liquid crystal element and the second liquid crystal element, a high light scattering effect can be obtained and favorable white display can be performed. Further, the first liquid crystal element and the second liquid crystal element are parallel to each other in a circuit; thus, voltage for driving both the first liquid crystal element and the second liquid crystal element can be the same as voltage for driving one of the first liquid crystal element and the second liquid crystal element.

Therefore, even when the thickness of the liquid crystal layer 208 is increased for favorable white display, the liquid crystal molecules can be made to respond without increase in the driving voltage of the liquid crystal elements. Consequently, in the liquid crystal display device, improvement in contrast ratio and reduction in power consumption can be achieved.

Polymer dispersed liquid crystal that can be used for the liquid crystal layer 208 is a liquid crystal system in which a layer where liquid crystals are dispersed in polymer is used as a liquid crystal layer. The liquid crystal is a micrograin with a diameter of approximately greater than or equal to 0.1 μm and less than or equal to 20 μm (typically approximately 1 μm). Note that a polymer dispersed liquid crystal (PDLC) mode is employed as a driving method.

Alternatively, polymer network liquid crystal (PNLC) may be used. A polymer network liquid crystal mode is a liquid crystal system in which a layer where liquid crystals are continuously arranged in a polymer network is used as a liquid crystal layer.

The liquid crystal layer 208 has a structure in which liquid crystal grains are dispersed in a polymer layer forming a polymer network. As the liquid crystal grains, nematic liquid crystal can be used.

A photocurable resin can be used for the polymer layer. The photocurable resin may be a monofunctional monomer such as acrylate or methacrylate; a polyfunctional monomer such as diacrylate, triacrylate, dimethacrylate, or trimethacrylate; or a mixture thereof. Further, the photocurable resin may have liquid crystallinity, non-liquid crystallinity, or both of them. A resin which is cured with light having a wavelength with which a photopolymerization initiator to be used is reacted may be selected as the photocurable resin, and an ultraviolet curable resin can be typically used.

For example, the liquid crystal layer 208 can be formed in such a manner that a liquid crystal material including liquid crystal grains using nematic liquid crystal, a polymer layer using a photocurable resin, and a photopolymerization initiator is irradiated with light having a wavelength with which the photocurable resin and the photopolymerization initiator are reacted and cured.

As the photopolymerization initiator, a radical polymerization initiator which generates radicals by light irradiation, an acid generator which generates an acid by light irradiation, or a base generator which generates a base by light irradiation may be used.

As a method for forming the liquid crystal layer 208, a dispenser method (a dropping method) or an injecting method by which a liquid crystal is injected using a capillary phenomenon after the first substrate 200 and the second substrate 201 are bonded to each other can be used.

The cell gap that is a thickness of the liquid crystal layer 208 may be greater than or equal 5 µm and less than or equal to 30 µm (preferably greater than or equal to 10 µm and less than or equal to 20 µm). In this specification, the thickness of a cell gap refers to the length (film thickness) of a thickest part of a liquid crystal layer.

The structure body 233 can be formed using an insulator including an insulating material (an organic material or an inorganic material). Typically, a visible light curable resin, an ultraviolet curable resin, or a thermosetting resin is preferably used. For example, an acrylic resin, an epoxy resin, an amine resin, or the like can be used. Note that the structure body 233 may have a stacked-layer structure of plural thin films.

The structure body 233 can have a columnar shape, a truncated conical or pyramidal shape with a flat top surface and a trapezoidal cross section, a conical or pyramidal shape with a rounded dome top, or the like. In this specification, the structure body is provided between the first common electrode layer 232 and the pixel electrode layer 230 so that the first common electrode layer 232 and the pixel electrode layer 230 are insulated from each other, and thus preferably has a shape which makes it difficult for the first common electrode layer 232 and the pixel electrode layer 230 to be in contact with each other.

Figure 3:
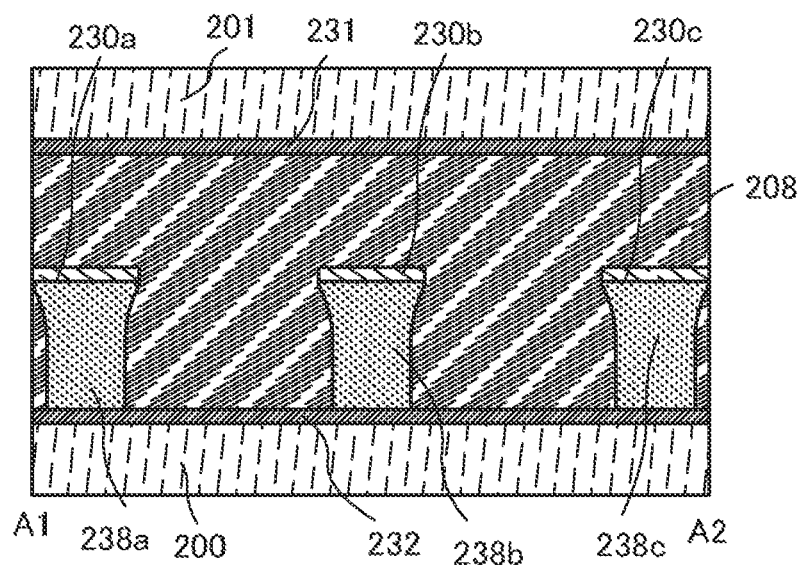
FIG. 3 illustrates one embodiment of a liquid crystal display device.

For example, as illustrated in FIG. 3, columnar structure bodies 238a, 238b, and 238c each having an inverse tapered shape whose cross section is generally a trapezoid where the area of a plane in contact with the pixel electrode layer 230 is larger than that of a plane in contact with the first common electrode layer 232, or the like are preferable. With the columnar structure bodies 238a, 238b, and 238c each having the inverse tapered shape illustrated in FIG. 3, the area of a region to be filled with liquid crystals in openings between the columnar structure bodies 238a, 238b, and 238c can be increased; accordingly, a larger number of liquid crystal molecules can be made to respond in the openings.

There is no particular limitation on the method for forming the structure bodies, and a dry method such as an evaporation method, a sputtering method, or a CVD method or a wet method such as spin coating, dip coating, spray coating, a droplet discharging method (an ink-jet method), nanoimprinting, or various printing methods (screen printing or offset printing) may be used in accordance with the material. As needed, an etching method (dry etching or wet etching) may be employed to form a desired pattern. For example, the structure bodies can be formed by performing a photolithography step on a photosensitive organic resin.

The structure body may be a continuous film having a plurality of projections, and the projections may be formed by arranging rib-shaped projections over a flat interlayer film.

Note that the shape of the pixel electrode layer formed over the structure body reflects the shape of the structure body and is also influenced by an etching process method.

The structure body may be formed in such a manner that a film such as an insulating film is formed and selectively etched. For example, the structure body can be formed by performing a photolithography step on a photosensitive organic resin.

When a material having a light-transmitting property with respect to visible light is used for the structure body, display using a black layer (or a coloring layer) provided under the structure body (on a side opposite to the viewing side) is not interrupted in the case where the liquid crystal layer is in a transparent state. The structure body may be formed using a material colored in black or another color and may be used as a black layer or a coloring layer.

In the case where the liquid crystal layer 208 is in a light-transmitting state (a transparent state), display that can be recognized from the viewing side depends on materials provided on the front and back sides of the liquid crystal layer 208. Therefore, when a black layer (or a coloring layer of a color other than black and white) is provided behind the liquid crystal layer 208 (on the side opposite to the viewing side), the black layer (or the coloring layer) can be seen. Accordingly, a pixel displays black (or the color of the coloring layer) on a display surface that can be recognized on the viewing side; thus, black display (or display of the color of the coloring layer) (dark display) can be performed.

The pixel electrode layer 230 may be formed using a reflective conductive layer or a light-transmitting conductive layer. In performing white display, when the pixel electrode layer 230 has reflectivity, incident light is reflected to the liquid crystal layer 208 side by the pixel electrode layer 230 even if the light passes through the liquid crystal layer 208 without being scattered; thus, the light can be efficiently scattered in the liquid crystal layer 208 and visibility of white display can be improved. On the other hand, when the pixel electrode layer 230 has a light-transmitting property, display using the black layer (or the coloring layer) provided under the pixel electrode layer 230 (on the side opposite to the viewing side) is not interrupted in the case where the liquid crystal layer 208 is in a transparent state.

The second common electrode layer 231 provided on the viewing side of the liquid crystal layer 208 is formed using a light-transmitting conductive material.

The first common electrode layer 232 may be formed using a reflective conductive layer or a light-transmitting conductive layer. In performing white display, when the first common electrode layer 232 has reflectivity, incident light is reflected to the liquid crystal layer 208 side by the first common electrode layer 232 even if the light passes through the liquid crystal layer 208 without being scattered; thus, the light can be efficiently scattered in the liquid crystal layer 208 and visibility of white display can be improved. On the other hand, when the first common electrode layer 232 has a light-transmitting property, the following effect can be obtained: display using the black layer (or the coloring layer) or a colored substrate, which is provided under the first common electrode layer 232 (on the side opposite to the viewing side), is not interrupted in the case where the liquid crystal layer 208 is in a transparent state.

FIGS. 2A to 2C illustrate examples of liquid crystal display devices each including a film exhibiting black. FIG. 2A illustrates an example in which a black layer 235 is provided between the first substrate 200 and the first common electrode layer 232 having a light-transmitting property. In the case where the liquid crystal layer 208 is in a light-transmitting state (a transparent state) in an on state, the black layer 235 can be seen from the second substrate 201 side through the liquid crystal layer 208 and the first common electrode layer 232; thus, black display is performed on a display surface that can be recognized on the viewing side.

Black display (or display of a color other than black and white) may be performed by using a black structure body, electrode layer, substrate, or the like (or a coloring layer of the color other than black and white) in the liquid crystal display device. FIG. 2B illustrates an example in which structure bodies 236a, 236b, and 236c exhibiting black are formed using a material exhibiting black. In the case where the liquid crystal layer 208 is in a light-transmitting state (a transparent state) in an on state, the structure bodies 236a, 236b, and 236c exhibiting black can be seen from the second substrate 201 side through the liquid crystal layer 208 and the pixel electrode layers 230a, 230b, and 230c; thus, black display is performed on a display surface that can be recognized on the viewing side. The position or area of a black (colored) region that can be seen can be controlled by the shape or arrangement of the structure bodies 236a, 236b, and 236c exhibiting black. Since black display is performed when the liquid crystal layer 208 transmits light, an image at the time of black display can be adjusted by controlling the position or area of the structure bodies 236a, 236b, and 236c exhibiting black in a pixel.

For example, the black layer 235 and the structure bodies 236a, 236b, and 236c exhibiting black can be formed using a black organic resin, which can be formed by mixing a black resin of a pigment material, carbon black, titanium black, or the like into a resin material such as photosensitive or non-photosensitive polyimide. Alternatively, a light-blocking metal film that absorbs light can be used as the black layer 235. Chromium or the like may be used, for example.

There is no particular limitation on the method for forming the black layer 235 and the structure bodies 236a, 236b, and 236c exhibiting black, and a dry method such as an evaporation method, a sputtering method, or a CVD method or a wet method such as spin coating, dip coating, spray coating, a droplet discharging method (such as an ink-jet method, screen printing, or offset printing) may be used in accordance with the material. As needed, an etching method (dry etching or wet etching) may be employed to form a desired pattern.

Each of the liquid crystal display devices illustrated in FIGS. 2A and 2B is a black-and-white (monochrome) liquid crystal display device in which the black layer is provided for black display; however, if a layer exhibiting a chromatic color such as a red layer, a green layer, or a blue layer is used instead of the black layer, display of the chromatic color can be performed. For example, a liquid crystal display device in which color display is performed can be obtained by providing a black layer, a red layer, a green layer, and a blue layer in positions where they can be seen when an electric field is generated in the liquid crystal layer 208 and the liquid crystal layer 208 transmits light. Cyan, magenta, yellow, or the like may be used as the chromatic color, other than colors such as red, green, and blue.

FIG. 2C illustrates an example in which a first common electrode layer 237 which is formed using a black conductive material and exhibits black is used without provision of a black layer. The first common electrode layer 237 is preferably formed using a material having low transmittance and, for example, can be formed using chromium or the like. Also in FIG. 2C, the black first common electrode layer 237 can be seen when an electric field is generated in the liquid crystal layer 208 and the liquid crystal layer 208 transmits light; thus, black display can be performed. In addition, the pixel electrode layers 230a, 230b, and 230c may be formed using a black conductive material to be electrodes exhibiting black.

Needless to say, the arrangement and shape of the structure bodies and the black layer (the coloring layer) are not limited to those of this embodiment, and may be set as appropriate. In order that display of the color of the black layer (the coloring layer) can be seen when the liquid crystal layer transmits light, the black layer (the coloring layer) needs to be positioned behind the liquid crystal layer when seen from the viewing side, and at least part of a component (a thin film) provided between the liquid crystal layer and the black layer (the coloring layer) needs to transmit light.

In the case where a reflective conductive material is used for the pixel electrode layer 230 or the first common electrode layer 232, for example, one or plural kinds of materials selected from metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy thereof; and a nitride thereof can used.

In the case where a light-transmitting conductive material is used for the pixel electrode layer 230 or the first common electrode layer 232, for example, indium tin oxide (ITO), indium zinc oxide (IZO) in which zinc oxide (ZnO) is mixed in indium oxide, a conductive material in which silicon oxide ($SiO_2$) is mixed in indium oxide, organoindium, organotin, indium oxide including tungsten oxide, indium zinc oxide including tungsten oxide, indium oxide including titanium oxide, indium tin oxide including titanium oxide, or the like can be used. The second common electrode layer 231 can be formed using any of the above light-transmitting conductive materials.

As the first substrate 200 and the second substrate 201, a glass substrate of barium borosilicate glass, aluminoborosilicate glass, or the like, a quartz substrate, a plastic substrate, or the like can be used.

In this manner, in the liquid crystal display device, improvement in contrast ratio and reduction in power consumption can be achieved.

A liquid crystal display device having higher visibility and image quality can be provided.

Since liquid crystals are not aligned in advance and incident light is not polarized in the case of using polymer dispersed liquid crystal, an alignment film and a polarizing plate are not necessarily provided.

Accordingly, since an alignment film and a polarizing plate are not provided in a liquid crystal display device using polymer dispersed liquid crystal, light is not absorbed by the alignment film and the polarizing plate; thus, a bright display screen with higher luminance can be obtained. High light use efficiency leads to reduction in power consumption of the liquid crystal display device. Steps and cost for providing the alignment film and the polarizing plate can be reduced, and thus higher throughput and lower cost can be realized. In addition, rubbing treatment is unnecessary because an alignment film is not provided; accordingly, dielectric breakdown caused by the rubbing treatment can be prevented and defects and damage of the liquid crystal display device can be reduced in the manufacturing process. Thus, the liquid crystal display device can be manufactured with high yield and productivity thereof can be improved. A transistor particularly has a possibility that electric characteristics of the transistor may fluctuate significantly owing to static electricity and deviate from the design range. Therefore, it is effective to use a polymer dispersed liquid crystal material for a liquid crystal display device including a transistor.

Embodiment 2

An example of an active matrix liquid crystal display device to which the invention disclosed in this specification is applied will be described with reference to FIGS. 4A and 4B.

Figure 4A:
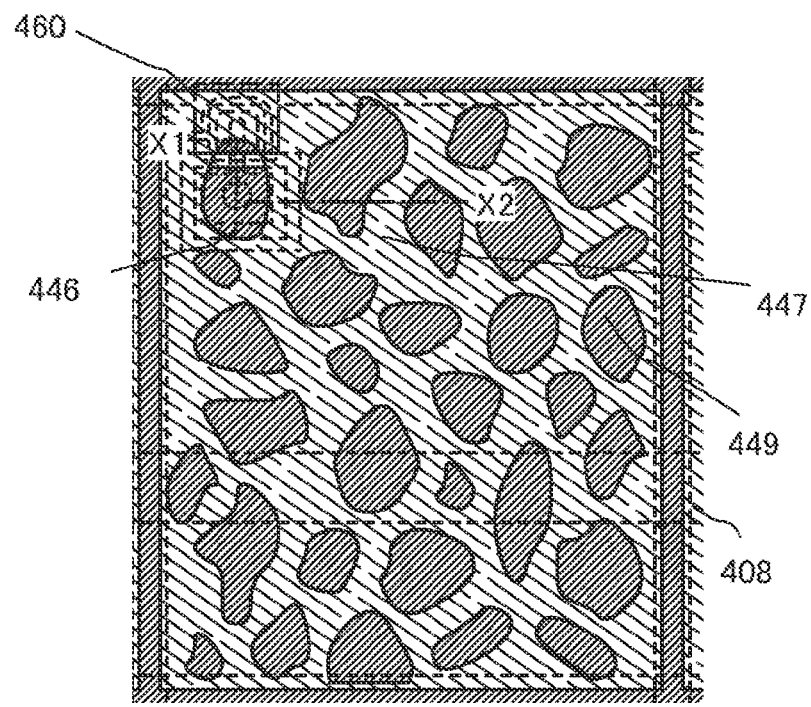
FIGS. 4A and 4B illustrate one embodiment of a liquid crystal display device.

FIG. 4A is a plan view of a liquid crystal display device and illustrates one pixel. FIG. 4B is a cross-sectional view along line X1-X2 in FIG. 4A.

In FIG. 4A, a plurality of source wiring layers (including a source electrode layer 405a) is arranged in parallel (extends in the vertical direction in the drawing) to be spaced from each other. A plurality of gate wiring layers (including a gate electrode layer 401) is arranged to extend in the direction generally perpendicular to the source wiring layers (in the horizontal direction in the drawing) and to be spaced from each other. Capacitor wiring layers 408 are arranged adjacent to the plurality of gate wiring layers and extend in the direction generally parallel to the gate wiring layers, that is, in the direction generally perpendicular to the source wiring layers (in the horizontal direction in the drawing). A generally rectangular space is surrounded by the source wiring layers and the gate wiring layers. A second electrode layer 449 that is a first common electrode layer of the liquid crystal display device, a structure body 445, and a first electrode layer 447 that is a pixel electrode layer are provided in that space, and a third electrode layer 448 that is a second common electrode layer is provided thereover with a liquid crystal layer 444 positioned therebetween. A transistor 460 for driving the pixel electrode layer is provided at an upper left corner of the drawing. A plurality of pixel electrode layers and a plurality of transistors are arranged in matrix.

Note that the plan view of FIG. 4A illustrates a first substrate 441 side and the liquid crystal layer 444, the third electrode layer 448, and a second substrate 442 are omitted.

Figure 4B:
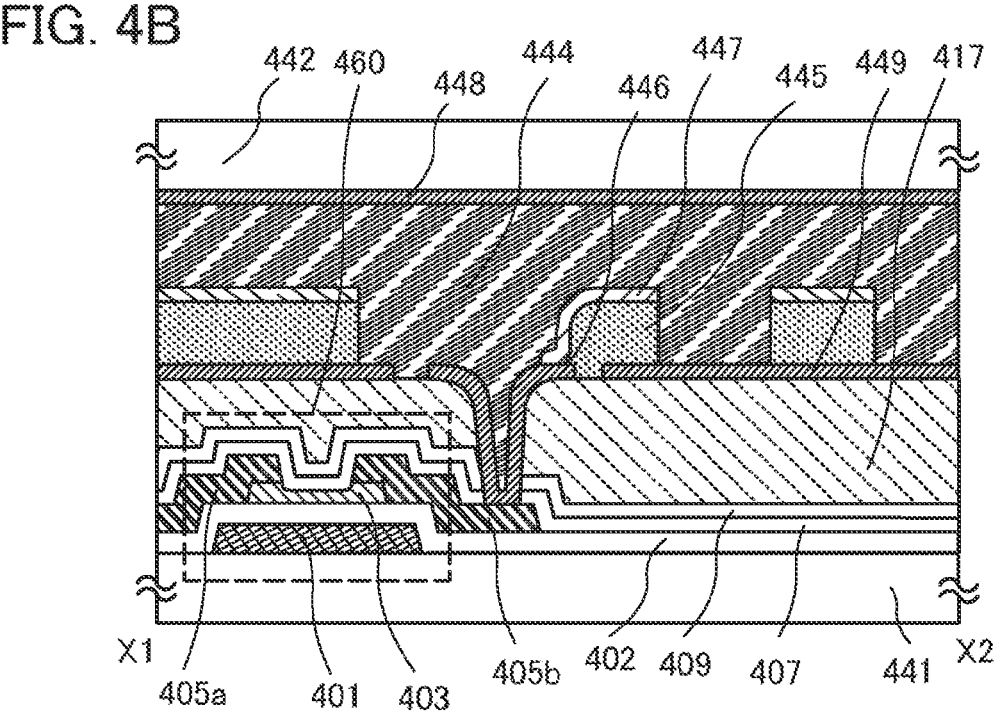

In the liquid crystal display device in FIGS. 4A and 4B, the first electrode layer 447 which is electrically connected to the transistor 460 functions as a pixel electrode layer, the second electrode layer 449 functions as a first common electrode layer, and the third electrode layer 448 functions as a second common electrode layer. Note that a capacitor is formed by the first electrode layer 447, the second electrode layer 449, and the capacitor wiring layer 408.

The pixel electrode layer (the first electrode layer 447) is supplied with a potential of an image signal through a drain electrode layer 405b and a wiring layer 446 which are electrically connected to a semiconductor layer of the transistor 460. On the other hand, the common electrode layers (the second electrode layer 449 and the third electrode layer 448) of a liquid crystal element are supplied with a fixed potential (e.g., a ground potential) serving as a reference with respect to the potential of the image signal supplied to the pixel electrode layer (the first electrode layer 447). The common potential is preferably set to a potential around an intermediate potential of an image signal which is transmitted as data in such a level as not to generate flickers. The common electrode layers (the second electrode layer 449 and the third electrode layer 448) can operate in a floating state (an electrically isolated state).

In this embodiment, an example in which the first electrode layer 447 is in contact with the drain electrode layer 405b of the transistor 460 with the wiring layer 446 that is formed in the same step as the second electrode layer 449 positioned between the first electrode layer 447 and the drain electrode layer 405b, and is formed continuously over the structure body 445 is described; however, an opening reaching the drain electrode layer 405b may be formed and the first electrode layer 447 may be in direct contact with the drain electrode layer 405b in the opening.

FIGS. 4A and 4B illustrate the liquid crystal display device where the first substrate 441 provided with the transistor 460 over which the second electrode layer 449, the structure body 445, and the first electrode layer 447 are provided with an interlayer film 417 positioned therebetween, and the second substrate 442 provided with the third electrode layer 448 are arranged so as to face each other with the liquid crystal layer 444 sandwiched therebetween.

The distances between the first electrode layer 447 and the second electrode layer 449 and the distance between the first electrode layer 447 and the third electrode layer 448, which are stacked with the liquid crystal layer 444 positioned therebetween, are set to distances at which liquid crystals in the liquid crystal layer 444 positioned between the first electrode layer 447 and the second electrode layer 449 and between the first electrode layer 447 and the third electrode layer 448 can respond when appropriate voltage is applied between the first electrode layer 447, and the second electrode layer 449 and the third electrode layer 448. The voltage to be applied is controlled as appropriate in accordance with the distances.

The structure body 445 is provided over one of the common electrode layers (in this embodiment, the second electrode layer 449 provided over the first substrate 441) so as to project into the liquid crystal layer 444 and the first electrode layer 447 is provided over the structure body 445, whereby the first electrode layer 447 can be positioned in the liquid crystal layer 444. The position and shape of the first electrode layer 447 in the liquid crystal layer 444 can be controlled by selecting the thickness and shape of the structure body 445.

In this embodiment, an example in which the structure body 445 and the first electrode layer 447 each have a shape with an opening pattern as illustrated in FIG. 4A, and the openings are provided in the structure body 445 and the first electrode layer 447 to form a spotted pattern is described. The openings provided in the structure body 445 and the first electrode layer 447 can be filled with the liquid crystal layer 444. The structure body 445 may be formed using a material and a method similar to those of the structure body 233 described in Embodiment 1.

In order to generate highly uniform electric fields in the liquid crystal layer 444, the first electrode layer 447 is preferably positioned in the liquid crystal layer so that the same interval (distance) is provided between the first electrode layer 447 and the second electrode layer 449 and between the first electrode layer 447 and the third electrode layer 448. Therefore, it is preferable that the thickness of the structure body 445 formed under the first electrode layer 447 be approximately half of the maximum thickness of the liquid crystal layer 444 (also referred to as a cell gap of the liquid crystal display device).

In contrast, the second electrode layer 449 and the third electrode layer 448 have planar and flat shapes. Further, each of the second electrode layer 449 and the third electrode layer 448 with which common voltage is applied to all pixels can be formed as a continuous plate-shaped conductive film in a pixel region including a plurality of pixels.

For the liquid crystal layer 444, polymer dispersed liquid crystal (PDLC) is used. Alternatively, polymer network liquid crystal (PNLC) may be used. The liquid crystal layer 444 may be formed using a material and a method similar to those of the liquid crystal layer 208 described in Embodiment 1.

In the liquid crystal layer 444, in the case of applying no voltage between the first electrode layer 447 and the second electrode layer 449 and between the first electrode layer 447 and the third electrode layer 448 (also referred to as an off state), liquid crystal grains dispersed in a polymer layer are oriented in a random manner to cause a difference between the refractive index of the polymer and the refractive index of liquid crystal molecules, and incident light is thus scattered by the liquid crystal grains to make the liquid crystal layer 444 opaque and clouded. Therefore, display that can be recognized from the viewing side is also white display.

On the other hand, in the case of applying voltage between the first electrode layer 447 and the second electrode layer 449 and between the first electrode layer 447 and the third electrode layer 448 (also referred to as an on state), an electric field is generated in the liquid crystal layer 444, and the liquid crystal molecules in the liquid crystal grains are oriented in the direction of the electric field such that the refractive index of the polymer corresponds with the refractive index in the short axis of the liquid crystal molecule. Thus, incident light is transmitted through the liquid crystal layer 444 without being scattered by the liquid crystal grains. Therefore, the liquid crystal layer 444 transmits light and is in a transparent state.

In the liquid crystal display device of this specification, white display is performed in such a manner that incident light is scattered by the liquid crystal grains dispersed and orientated in a random manner in the liquid crystal layer 444. The liquid crystal layer 444 preferably has high light scattering intensity to perform favorable white display close to a plane of paper. The light scattering intensity of the liquid crystal layer 444 is enhanced as the number of times of collision between light and the liquid crystal grains dispersed in the liquid crystal layer 444 is increased; therefore, it is effective to enhance the light scattering intensity of the liquid crystal layer 444 by increasing the thickness of the liquid crystal layer 444 and increasing the number of liquid crystal grains included in the liquid crystal layer 444 so that the number of times of collision between the light entering the liquid crystal layer 444 and the liquid crystal grains is increased.

However, when the thickness of the liquid crystal layer 444 is increased, higher driving voltage is needed to make the liquid crystal molecules respond and to drive the liquid crystal element; as a result, power consumption is increased. Moreover, when the driving voltage of the liquid crystal element in which the thickness of the liquid crystal layer 444 is increased is lowered, the liquid crystal molecules respond insufficiently in the liquid crystal element in an on state and light transmittance is decreased; accordingly, the contrast of the liquid crystal display device is decreased.

By providing the first electrode layer 447 in the center of the liquid crystal layer 444 sandwiched between the second electrode layer 449 and the third electrode layer 448, a structure in which the following two optical elements are stacked can be obtained: a first liquid crystal element including the second electrode layer 449, the liquid crystal layer 444, and the first electrode layer 447; and a second liquid crystal element including the first electrode layer 447, the liquid crystal layer 444, and the third electrode layer 448.

Thus, in the liquid crystal layer 444, the liquid crystal layer 444 positioned between the second electrode layer 449 and the first electrode layer 447 is controlled by an electric field generated between the second electrode layer 449 and the first electrode layer 447. The liquid crystal layer 444 positioned between the first electrode layer 447 and the third electrode layer 448 is controlled by an electric field generated between the first electrode layer 447 and the third electrode layer 448. Since the thickness of the liquid crystal layer 444 can be increased by stacking the first liquid crystal element and the second liquid crystal element, a high light scattering effect can be obtained and favorable white display can be performed. Further, the first liquid crystal element and the second liquid crystal element are parallel to each other in a circuit; thus, voltage for driving both the first liquid crystal element and the second liquid crystal element can be the same as voltage for driving one of the first liquid crystal element and the second liquid crystal element.

Therefore, even when the thickness of the liquid crystal layer 444 is increased for favorable white display, the liquid crystal molecules can be made to respond without increase in the driving voltage of the liquid crystal elements. Consequently, in the liquid crystal display device, improvement in contrast ratio and reduction in power consumption can be achieved.

The cell gap that is a thickness of the liquid crystal layer 444 may be greater than or equal 5 μm and less than or equal to 30 μm (preferably greater than or equal to 10 μm and less than or equal to 20 μm). In this specification, the thickness of a cell gap refers to the length (film thickness) of a thickest part of a liquid crystal layer.

When a material having a light-transmitting property with respect to visible light is used for the structure body, display using a black layer (or a coloring layer) provided under the structure body (on a side opposite to the viewing side) is not interrupted in the case where the liquid crystal layer is in a transparent state. The structure body may be formed using a material colored in black or another color and may be used as a black layer or a coloring layer.

In the case where the liquid crystal layer 444 is in a light-transmitting state (a transparent state), display that can be recognized from the viewing side depends on materials provided on the front and back sides of the liquid crystal layer 444. Therefore, when a black layer (or a coloring layer of a color other than black and white) is provided behind the liquid crystal layer 444 (on the side opposite to the viewing side), the black layer (or the coloring layer) can be seen. Accordingly, a pixel displays black on a display surface that can be recognized on the viewing side; thus, black display (or display of the color of the coloring layer) (dark display) can be performed.

The provision of the black layer as a coloring layer can provide a liquid crystal display device which produce black-and-white (monochrome) display. In addition, when a coloring layer of a chromatic color such as a red layer, a green layer, or a blue layer is used instead of the black layer, the chromatic color can be displayed. Therefore, the selection of multiple colors for the coloring layer can also provide a liquid crystal display device for full-color display.

FIGS. 4A and 4B illustrate an example of a black-and-white (monochrome) liquid crystal display device in which a black layer exhibiting black is used as the interlayer film 417 for black display; however, if a layer exhibiting a chromatic color such as a red layer, a green layer, or a blue layer is used instead of the black layer, display of the chromatic color can be performed.

The first electrode layer 447 may be formed using a reflective conductive layer or a light-transmitting conductive layer. In performing white display, when the first electrode layer 447 has reflectivity, incident light is reflected to the liquid crystal layer 444 side by the first electrode layer 447 even if the light passes through the liquid crystal layer 444 without being scattered; thus, the light can be efficiently scattered in the liquid crystal layer 444 and visibility of white display can be improved. On the other hand, when the first electrode layer 447 has a light-transmitting property, display using the black layer (or the coloring layer) provided under the first electrode layer 447 (on the side opposite to the viewing side) is not interrupted in the case where the liquid crystal layer 444 is in a transparent state. Further, the first electrode layer 447 may be formed using a conductive layer exhibiting black with the use of a black conductive material to function also as a black layer.

The second electrode layer 449 may be formed using a reflective conductive layer or a light-transmitting conductive layer. In performing white display, when the second electrode layer 449 has reflectivity, incident light is reflected to the liquid crystal layer 444 side by the second electrode layer 449 even if the light passes through the liquid crystal layer 444 without being scattered; thus, the light can be efficiently scattered in the liquid crystal layer 444 and visibility of white display can be improved. On the other hand, when the second electrode layer 449 has a light-transmitting property, display using the black layer (or the coloring layer) provided under the second electrode layer 449 (on the side opposite to the viewing side) is not interrupted in the case where the liquid crystal layer 444 is in a transparent state.

The third electrode layer 448 provided on the viewing side of the liquid crystal layer 444 is formed using a light-transmitting conductive material.

The transistor 460 is an inverted staggered thin film transistor which includes, over the first substrate 441 having an insulating surface, the gate electrode layer 401, a gate insulating layer 402, a semiconductor layer 403, the source electrode layer 405a, and the drain electrode layer 405b.

An insulating film 407 which covers the transistor 460 and is in contact with the semiconductor layer 403, and an insulating layer 409 which is a protective insulating layer are provided. The interlayer film 417 is stacked over the insulating layer 409.

There is no particular limitation on the method for forming the interlayer film 417, and the following method can be employed in accordance with the material: spin coating, dip coating, spray coating, a droplet discharging method (such as an ink-jet method, screen printing, or offset printing), roll coating, curtain coating, knife coating, or the like.

The first substrate 441 and the second substrate 442 are bonded to each other with a sealant, with the liquid crystal layer 444 sandwiched therebetween.

As the sealant, it is preferable to use a visible light curable resin, an ultraviolet curable resin, or a thermosetting resin, typically. Typically, an acrylic resin, an epoxy resin, an amine resin, or the like can be used. Further, a photopolymerization initiator (typically an ultraviolet light polymerization initiator), a thermosetting agent, a filler, or a coupling agent may be included in the sealant.

An insulating film serving as a base film may be provided between the first substrate 441 and the gate electrode layer 401. The base film has a function of preventing diffusion of an impurity element from the first substrate 441, and can be formed to have a single-layer structure or a stacked-layer structure using one or more of a silicon nitride film, a silicon oxide film, a silicon nitride oxide film, and a silicon oxynitride film.

The gate electrode layer 401 can be formed to have a single-layer structure or a stacked-layer structure using a metal material such as molybdenum, titanium, chromium, tantalum, tungsten, aluminum, copper, neodymium, or scandium, or an alloy material which includes any of these as a main component.

For example, as a two-layer structure of the gate electrode layer 401, the following stacked-layer structure is preferable: a two-layer structure in which a molybdenum layer is stacked over an aluminum layer, a two-layer structure in which a molybdenum layer is stacked over a copper layer, a two-layer structure in which a titanium nitride layer or a tantalum nitride layer is stacked over a copper layer, or a two-layer structure in which a titanium nitride layer and a molybdenum layer are stacked. As a three-layer structure, a structure in which a tungsten layer or a tungsten nitride layer, an alloy layer of aluminum and silicon or an alloy layer of aluminum and titanium, and a titanium nitride layer or a titanium layer are stacked is preferable.

The gate insulating layer 402 can be formed to have a single-layer structure or a stacked-layer structure using any of a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, and a hafnium oxide layer by a plasma CVD method, a sputtering method, or the like. Alternatively, the gate insulating layer 402 can be formed using a silicon oxide layer by a CVD method in which an organosilane gas is used. As the organosilane gas, a compound including silicon such as tetraethoxysilane (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane (chemical formula: $SiH(OC_2H_5)_3$), or trisdimethylaminosilane (chemical formula: $SiH(N(CH_3)_2)_3$) can be used.

In a process of forming the semiconductor layer, the electrode layer, and the wiring layer, an etching step is used to process thin films into desired shapes. Dry etching or wet etching can be used for the etching step.

As an etching apparatus used for the dry etching, an etching apparatus using a reactive ion etching method (an RIE method), or a dry etching apparatus using a high-density plasma source such as electron cyclotron resonance (ECR) or inductively coupled plasma (ICP) can be used.

In order to etch the films into desired shapes, the etching condition (such as the amount of electric power applied to a coil-shaped electrode, the amount of electric power applied to an electrode on a substrate side, or the temperature of the electrode on the substrate side) is adjusted as appropriate.

In order to etch the films into desired shapes, the etching condition (such as an etchant, etching time, or temperature) is adjusted as appropriate in accordance with the material.

As a material for the source electrode layer 405a and the drain electrode layer 405b, an element selected from Al, Cr, Ta, Ti, Mo, and W, an alloy including any of these elements as a component, an alloy including any of these elements in combination, and the like can be given. Further, in the case where heat treatment is performed, the conductive film preferably has heat resistance enough to withstand the heat treatment. Since use of Al alone brings disadvantages such as low heat resistance and a tendency to corrosion, aluminum is used in combination with a heat-resistant conductive material. As the heat-resistant conductive material which is used in combination with Al, any of the following materials may be used: an element selected from titanium (Ti), tantalum (Ta), tungsten (W), molybdenum (Mo), chromium (Cr), neodymium (Nd), and scandium (Sc), an alloy including any of these elements as a component, an alloy including any of these elements in combination, and a nitride including any of these elements as a component.

Note that the semiconductor layer 403 of the transistor 460 is an example of a semiconductor layer which is partly etched so as to have a groove (a depression).

As the insulating film 407 and the insulating layer 409 which cover the transistor 460, an inorganic insulating film or an organic insulating film which is formed by a dry method or a wet method can be used. For example, a silicon nitride film, a silicon oxide film, a silicon oxynitride film, an aluminum oxide film, a tantalum oxide film, or the like, which is obtained by a CVD method, a sputtering method, or the like, can be used. Alternatively, an organic material such as polyimide, acrylic, benzocyclobutene, polyamide, or epoxy can be used. Other than such organic materials, it is also possible to use a low-dielectric constant material (a low-k material), a siloxane-based resin, phosphosilicate glass (PSG), borophosphosilicate glass (BPSG), or the like.

Note that the siloxane-based resin corresponds to a resin including a Si—O—Si bond formed using a siloxane-based material as a starting material. The siloxane-based resin may include, as a substituent, an organic group (e.g., an alkyl group or an aryl group) or a fluoro group. In addition, the organic group may include a fluoro group. A siloxane-based resin is applied by a coating method and baked; thus, the insulating film 407 can be formed.

The insulating film 407 and the insulating layer 409 may be formed by stacking plural insulating films formed using any of these materials. For example, a structure in which an organic resin film is stacked over an inorganic insulating film may be employed.

Further, with the use of a resist mask having regions with plural thicknesses (typically two different thicknesses) which is formed using a multi-tone mask, the number of resist masks can be reduced, resulting in a simplified process and lower cost.

In this manner, in a liquid crystal display device including a polymer dispersed liquid crystal material, the contrast ratio can be increased.

In this manner, in the liquid crystal display device, improvement in contrast ratio and reduction in power consumption can be achieved.

A liquid crystal display device having higher visibility and image quality can be provided.

Since liquid crystals are not aligned in advance and incident light is not polarized in the case of using polymer dispersed liquid crystal, an alignment film and a polarizing plate are not necessarily provided.

Accordingly, since an alignment film and a polarizing plate are not provided in a liquid crystal display device using polymer dispersed liquid crystal, light is not absorbed by the alignment film and the polarizing plate; thus, a bright display screen with higher luminance can be obtained. High light use efficiency leads to reduction in power consumption of the liquid crystal display device. Steps and cost for providing the alignment film and the polarizing plate can be reduced, and thus higher throughput and lower cost can be realized. In addition, rubbing treatment is unnecessary because an alignment film is not provided; accordingly, dielectric breakdown caused by the rubbing treatment can be prevented and defects and damage of the liquid crystal display device can be reduced in the manufacturing process. Thus, the liquid crystal display device can be manufactured with high yield and productivity thereof can be improved. A transistor particularly has a possibility that electric characteristics of the transistor may fluctuate significantly owing to static electricity and deviate from the design range. Therefore, it is effective to use a polymer dispersed liquid crystal material for a liquid crystal display device including a transistor.

Embodiment 3

In this embodiment, a method for driving a liquid crystal display device, by which power consumption can be further reduced in combination with Embodiment 1 or 2, will be described. The same portions as Embodiment 1 or portions having functions similar to those of Embodiment 1 can be formed in a manner similar to that of Embodiment 1; therefore, repetitive description thereof is omitted. In addition, detailed description of the same portions is not repeated.

In a liquid crystal display device, display is performed on a screen by switching a plurality of images which are time-divided to correspond to a plurality of frame periods at high speed. However, there is display of an image which does not change in successive frame periods (also referred to as still image display), for example, between an n-th frame and an (n+1)-th frame when a plurality of images which are time-divided to correspond to a plurality of frame periods are switched at high speed. In this specification, an image displayed in the still image display is also referred to as a still image.

In this embodiment, the following display modes are employed. In the case of display where image signals in successive frames are different (also referred to as moving image display), an image signal is written in every frame. In the case of still image display where image signals in successive frames are the same, a new image signal is not written, a pixel electrode and common electrode with which voltage is applied to a liquid crystal element are set in a floating state (floating) so that the voltage applied to the liquid crystal element is held, and a still image is displayed without supply of a new potential. Note that in this specification, the moving image display refers to display in the case where image signals in successive frames are different and new image data needs to be written, and even rewriting of one frame is regarded as moving image display.

A liquid crystal display device of this embodiment and switching of display modes of the liquid crystal display device will be described with reference to FIG. 9, FIG. 10, FIG. 11, FIGS. 12A and 12B, and FIG. 13.

Components of a liquid crystal display device 100 of this embodiment will be described with reference to a block diagram of FIG. 9. The liquid crystal display device 100 is a reflective liquid crystal display device in which display is performed by utilizing reflection of outside light in a pixel, and includes an image processing circuit 110, a power source 116, and a display panel 120.

To the liquid crystal display device 100, an image signal (an image signal Data) is supplied from an external device connected thereto. Note that power supply potentials (a high power supply potential Vdd, a low power supply potential Vss, and a common potential Vcom) are supplied by turning on the power source 116 of the liquid crystal display device and starting supplying power, and control signals (a start pulse SP and a clock signal CK) are supplied by a display control circuit 113. The supply of the power supply potentials (the high power supply potential Vdd, the low power supply potential Vss, and the common potential Vcom) is stopped by turning off the power source 116, so that the supply of the power supply potentials to the display panel is stopped.

In the case where the image signal is an analog signal, the image signal is preferably converted into a digital signal through an A/D converter or the like to be supplied to the image processing circuit 110 of the liquid crystal display device 100; this is because, when a difference of image signals is detected later, the difference can be easily detected.

A configuration of the image processing circuit 110 and a procedure in which the image processing circuit 110 processes a signal will be described.

The image processing circuit 110 includes a memory circuit 111, a comparison circuit 112, the display control circuit 113, and a selection circuit 115. The image processing circuit 110 generates a display panel image signal from the input digital image signal Data. The display panel image signal is an image signal that controls the display panel 120. The image processing circuit 110 outputs a signal that controls a common electrode 128 to a switching element 127.

The memory circuit 111 includes a plurality of frame memories for storing image signals for a plurality of frames. The number of frame memories included in the memory circuit 111 is not particularly limited as long as the image signals for a plurality of frames can be stored. Note that the frame memory may be formed using a memory element such as dynamic random access memory (DRAM) or static random access memory (SRAM).

Note that the number of frame memories is not particularly limited as long as an image signal can be stored in each frame period. In addition, the image signals stored in the frame memories are selectively read by the comparison circuit 112 and the display control circuit 113. A frame memory 111b in the diagram is conceptually illustrated as a memory region for one frame.

The comparison circuit 112 is a circuit which selectively reads image signals in successive frame periods stored in the memory circuit 111, compares the image signals in the successive frames in each pixel, and detects a difference.

In this embodiment, depending on whether a difference of image signals between frames is detected or not, operation of the display control circuit 113 and the selection circuit 115 is determined. When a difference between frames is detected in any of the pixels by the comparison circuit 112 (when there is a difference), the comparison circuit 112 determines that image signals are not for a still image and that the successive frame periods between which the difference is detected are periods for a moving image.

In the case where a difference between frames is detected in only part of pixels, image data may be written to only the pixels in which the difference is detected. In this case, a decoder circuit is used as a gate line side driver circuit 121A and a source line side driver circuit 121B in a driver circuit portion 121.

On the other hand, when image signals are compared in the comparison circuit 112 and a difference is not detected in any pixel (when there is no difference), successive frame periods between which no difference is detected are determined as periods for a still image. In other words, by detection of a difference between image signals in successive frame periods by the comparison circuit 112, the image signals are determined as image signals for a moving image or image signals for a still image.

Note that the criterion of the comparison for determining that there is a difference may be set such that the difference is recognized when the degree of the difference exceeds a certain level. The comparison circuit 112 may be set to detect a difference by the absolute value of the difference.

In this embodiment, the structure in which whether an image is a moving image for which writing of image data is needed or a still image is determined by detection of a difference between image signals in successive frame periods by the comparison circuit 112 provided inside the liquid crystal display device 100 is described; however, an embodiment of the invention disclosed in this specification is not limited to this structure. A signal indicating whether an image is a moving image or a still image may be supplied from the outside.

The selection circuit 115 has a structure in which a plurality of switches formed of transistors is provided, for example. In the case where the comparison circuit 112 detects a difference in successive frames, that is, the image is a moving image, the selection circuit 115 selects an image signal of the moving image from the frame memories in the memory circuit 111 and outputs the image signal to the display control circuit 113.

In the case where the comparison circuit 112 does not detect a difference in the successive frames, that is, the image is a still image, the selection circuit 115 does not output an image signal to the display control circuit 113 from the frame memories in the memory circuit 111. With the structure in which an image signal is not output from the frame memories to the display control circuit 113, power consumption of the liquid crystal display device can be reduced.

Note that in the liquid crystal display device of this embodiment, a mode performed in such a manner that the comparison circuit 112 determines an image as a still image is a still image display mode, and a mode performed in such a manner that the comparison circuit 112 determines an image as a moving image is a moving image display mode.

The display control circuit 113 supplies an image signal selected by the selection circuit 115, control signals (specifically, signals for controlling switching between supply or stop of control signals such as the start pulse SP and the clock signal CK), and power supply potentials (the high power supply potential Vdd, the low power supply potential Vss, and the common potential Vcom) to the display panel 120.

Note that the image processing circuit described in this embodiment as an example may have a display-mode switching function. The display-mode switching function is a function of switching between a moving image display mode and a still image display mode in such a manner that a user of the liquid crystal display device selects an operation mode of the liquid crystal display device by hand or using an external connection device.

The selection circuit 115 can output an image signal to the display control circuit 113 in accordance with a signal input from a display-mode switching circuit.

For example, in the case where a mode-switching signal is input to the selection circuit 115 from the display-mode switching circuit while operation is performed in the still image display mode, even when the comparison circuit 112 does not detect a difference between image signals in successive frame periods, the selection circuit 115 can be operated in a mode in which input image signals are sequentially output to the display control circuit 113, that is, in the moving image display mode. In the case where a mode-switching signal is input to the selection circuit 115 from the display-mode switching circuit while operation is performed in the moving image display mode, even when the comparison circuit 112 detects a difference between image signals in successive frame periods, the selection circuit 115 can be operated in a mode in which only an image signal of one selected frame is output, that is, in the still image display mode. As a result, in the liquid crystal display device of this embodiment, one frame of a moving image is displayed as a still image.

In this embodiment, the display panel 120 includes the switching element 127 besides a pixel portion 122. In this embodiment, the display panel 120 includes a first substrate and a second substrate. The first substrate is provided with the driver circuit portion 121, the pixel portion 122, and the switching element 127.

Figure 10:
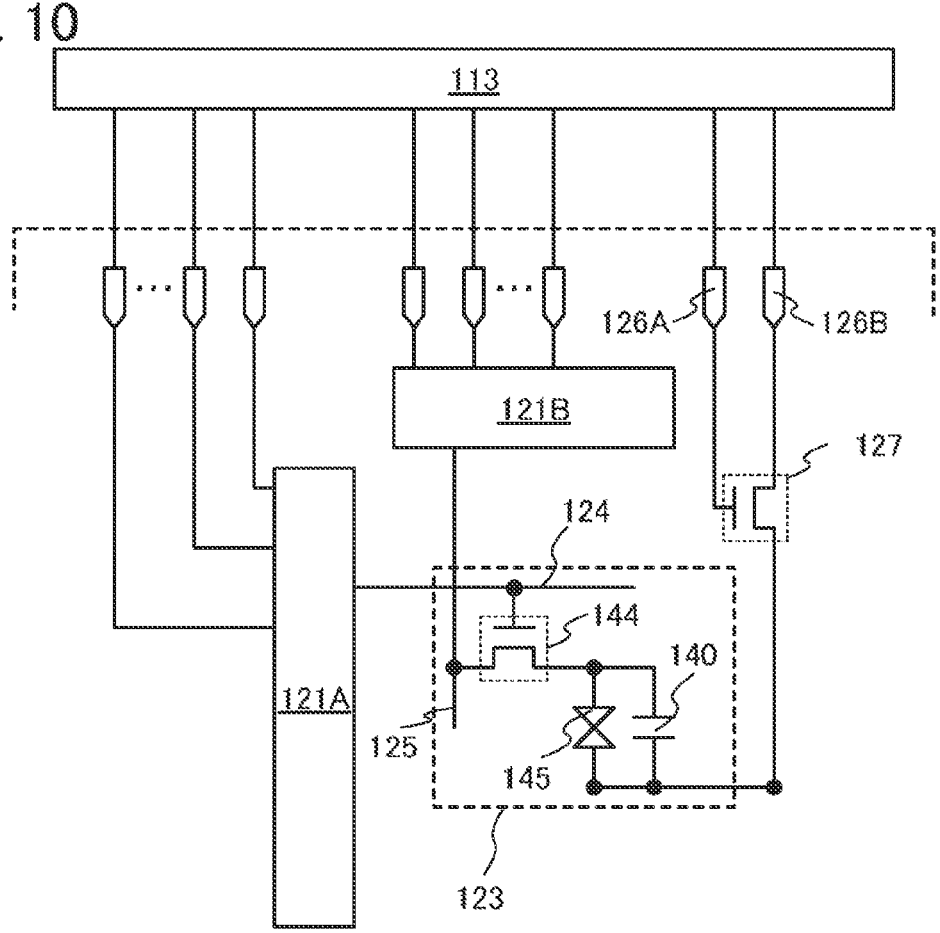
FIG. 10 illustrates one embodiment of a liquid crystal display device.

A pixel 123 includes a transistor 144 as a switching element, and a capacitor 140 and a liquid crystal element 145 which are connected to the transistor 144 (see FIG. 10).

A transistor having low off-state current is preferably used as the transistor 144. When the transistor 144 is off, electric charge accumulated in the liquid crystal element 145 and the capacitor 140 which are connected to the transistor 144 having low off-state current is less likely to leak because the transistor 144 is provided, and a state where a signal is written before the transistor 144 is turned off can be held for a long time.

In this embodiment, liquid crystals are controlled by a vertical electric field that is generated by the pixel electrode provided over the first substrate and the common electrode provided on the second substrate which faces the first substrate.

The switching element 127 supplies the common potential Vcom to the common electrode 128 in accordance with a control signal output from the display control circuit 113. As the switching element 127, a transistor can be used. A gate electrode and one of a source electrode and a drain electrode of the transistor may be connected to the display control circuit 113, the common potential Vcom may be supplied from the display control circuit 113 to the one of the source electrode and the drain electrode through a terminal portion 126, and the other of the source electrode and the drain electrode may be connected to the common electrode 128. Note that the switching element 127 may be formed over the same substrate as the driver circuit portion 121 or the pixel portion 122. Alternatively, the switching element 127 may be formed over another substrate.

A transistor having low off-state current is used as the switching element 127, whereby reduction over time in the voltage applied to both terminals of the liquid crystal element 145 can be suppressed.

In a common connection portion, a terminal connected to a source electrode or a drain electrode of the switching element 127 and the common electrode 128 are electrically connected to each other.

One of the source electrode and the drain electrode of the switching element 127 using a transistor that is one embodiment of a switching element is connected to the other electrode of the capacitor 140 and the other electrode of the liquid crystal element 145, which are not connected to the transistor 144. The other of the source electrode and the drain electrode of the switching element 127 is connected to a terminal 126B through the common connection portion. A gate electrode of the switching element 127 is connected to a terminal 126A.

Next, the state of signals supplied to the pixels will be described with reference to an equivalent circuit diagram of the liquid crystal display device illustrated in FIG. 10 and a timing chart in FIG. 11.

Figure 11:
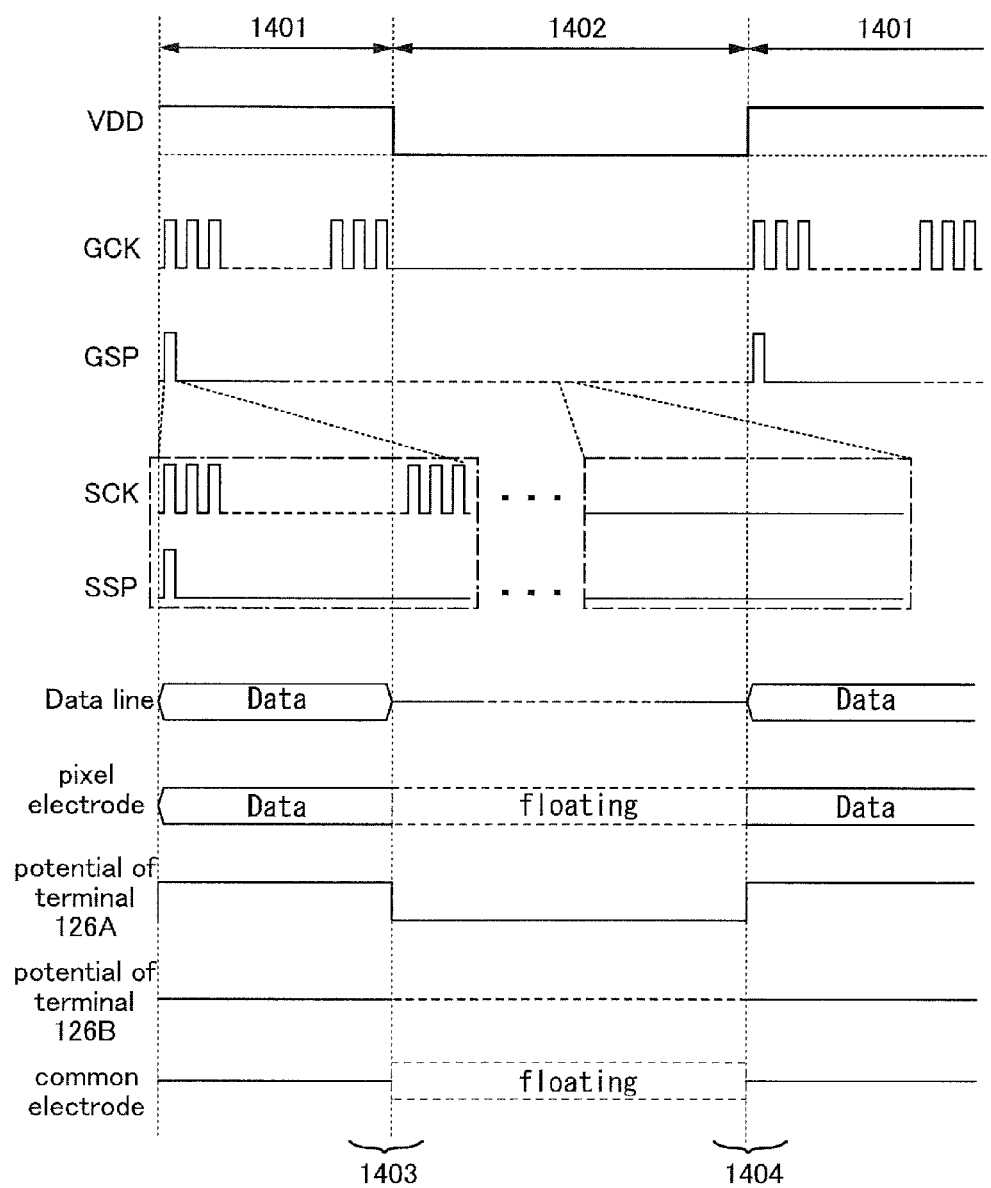
FIG. 11 is a timing chart illustrating one embodiment of a method for driving a liquid crystal display device.

In FIG. 11, a clock signal GCK and a start pulse GSP which are supplied from the display control circuit 113 to the gate line side driver circuit 121A are illustrated. In addition, a clock signal SCK and a start pulse SSP which are supplied from the display control circuit 113 to the source line side driver circuit 121B are illustrated. Note that for description of the timing of output of the clock signals, the waveforms of the clock signals are each shown by a simple rectangular wave in FIG. 11.

In FIG. 11, a potential of a source line (Data line) 125, a potential of the pixel electrode, a potential of the terminal 126A, a potential of the terminal 126B, and a potential of the common electrode are illustrated.

In FIG. 11, a period 1401 corresponds to a period in which image signals for displaying a moving image are written. In the period 1401, operation is performed so that the image signals and a common potential are supplied to the pixels in the pixel portion 122 and the common electrode, respectively.

A period 1402 corresponds to a period in which a still image is displayed. In the period 1402, the supply of the image signals to the pixels in the pixel portion 122 and the supply of the common potential to the common electrode are stopped. Note that in the period 1402 in FIG. 11, each signal is supplied so that the driver circuit portion stops operating; however, it is preferable to write image signals periodically in accordance with the length of the period 1402 and the refresh rate so as to prevent deterioration of a still image.

First, a timing chart in the period 1401 will be described. In the period 1401, a clock signal is always supplied as the clock signal GCK, and a pulse corresponding to a vertical synchronization frequency is supplied as the start pulse GSP. In the period 1401, a clock signal is always supplied as the clock signal SCK, and a pulse corresponding to one gate selection period is supplied as the start pulse SSP.

An image signal Data is supplied to pixels in each row through the source line 125, and a potential of the source line 125 is supplied to the pixel electrode in accordance with a potential of a gate line 124.

A potential at which the switching element 127 is turned on is supplied from the display control circuit 113 to the terminal 126A of the switching element 127, so that a common potential is supplied to the common electrode through the terminal 126B.

On the other hand, the period 1402 is a period in which a still image is displayed. Next, a timing chart in the period 1402 will be described. In the period 1402, supply of the clock signal GCK, the start pulse GSP, the clock signal SCK, and the start pulse SSP is stopped. In addition, the supply of the image signal Data to the source line 125 is stopped in the period 1402. In the period 1402 in which the supply of the clock signal GCK and the start pulse GSP is stopped, the transistor 144 is turned off and the potential of the pixel electrode is put in a floating state.

A potential at which the switching element 127 is turned off is supplied from the display control circuit 113 to the terminal 126A of the switching element 127, so that the potential of the common electrode is put in a floating state.

In the period 1402, the potentials of both electrodes of the liquid crystal element 145, that is, the pixel electrode and the common electrode, are put in a floating state; thus, a still image can be displayed without additional supply of a potential.

Further, the supply of the clock signals and the start pulses to the gate line side driver circuit 121A and the source line side driver circuit 121B is stopped, whereby reduction in power consumption can be achieved.

In particular, by employing a transistor having low off-state current as the transistor 144 and the switching element 127, reduction over time in the voltage applied to both terminals of the liquid crystal element 145 can be suppressed.

Figure 12A:
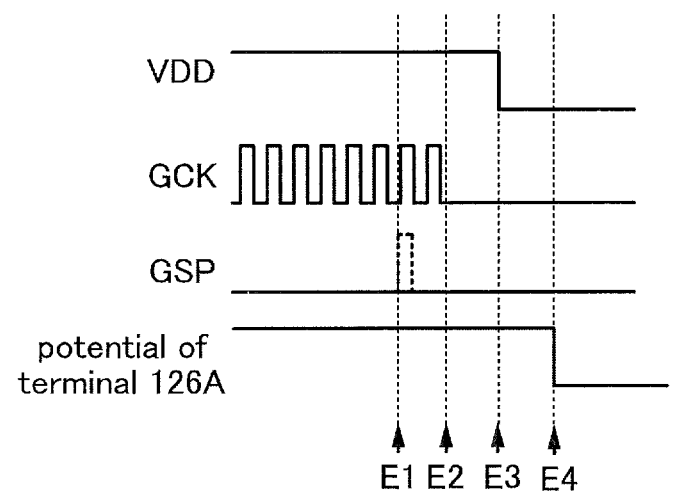
FIGS. 12A and 12B are timing charts illustrating embodiments of a method for driving a liquid crystal display device.
Figure 12B:
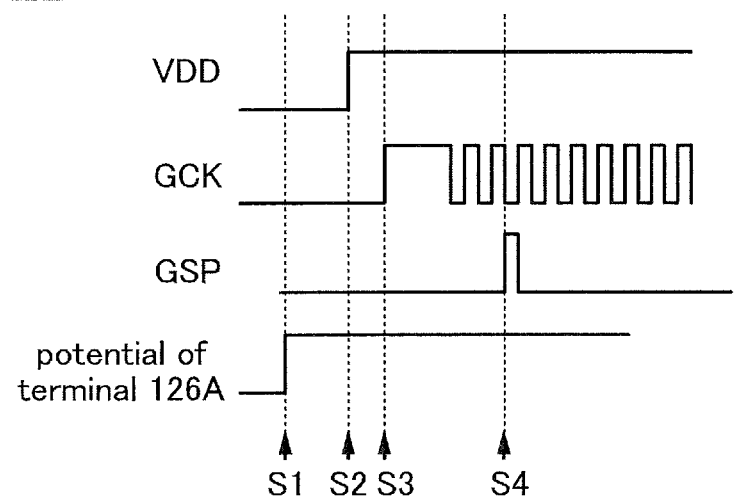

Next, operation of the display control circuit in a period in which a displayed image is switched from a moving image to a still image (a period 1403 in FIG. 11) and in a period in which a displayed image is switched from a still image to a moving image (a period 1404 in FIG. 11) will be described with reference to FIGS. 12A and 12B. FIGS. 12A and 12B illustrate the high power supply potential Vdd, the clock signal (here GCK), and the start pulse signal (here GSP)

which are output from the display control circuit, and the potential of the terminal 126A.

FIG. 12A illustrates operation of the display control circuit in the period 1403 in which a displayed image is switched from a moving image to a still image. The display control circuit stops the supply of the start pulse GSP (E1 in FIG. 12A, a first step). The supply of the start pulse GSP is stopped, and then the supply of a plurality of clock signals GCK is stopped after pulse output reaches the last stage of a shift register (E2 in FIG. 12A, a second step). Then, the high power supply potential Vdd of power supply voltage is changed to the low power supply potential Vss (E3 in FIG. 12A, a third step). After that, the potential of the terminal 126A is changed to a potential at which the switching element 127 is turned off (E4 in FIG. 12A, a fourth step).

Through the above steps, the supply of signals to the driver circuit portion 121 can be stopped without a malfunction of the driver circuit portion 121. The malfunction that occurs when a displayed image is switched from a moving image to a still image causes noise, and the noise is held as a still image; therefore, a liquid crystal display device that includes a display control circuit with few malfunctions can display a still image which is not deteriorated so much.

Next, FIG. 12B illustrates operation of the display control circuit in the period 1404 in which a displayed image is switched from a still image to a moving image. The display control circuit changes the potential of the terminal 126A to a potential at which the switching element 127 is turned on (S1 in FIG. 12B, a first step). Next, the power supply voltage is changed from the low power supply potential Vss to the high power supply potential Vdd (S2 in FIG. 12B, a second step). Then, a high-level potential is supplied as the clock signal GCK, and then a plurality of clock signals GCK is supplied (S3 in FIG. 12B, a third step). After that, the start pulse GSP is supplied (S4 in FIG. 12B, a fourth step).

Through the above steps, the supply of driving signals to the driver circuit portion 121 can be resumed without a malfunction of the driver circuit portion 121. Potentials of the wirings are appropriately and sequentially changed back to those at the time of displaying a moving image, whereby the driver circuit portion can be driven without a malfunction.

Figure 13:
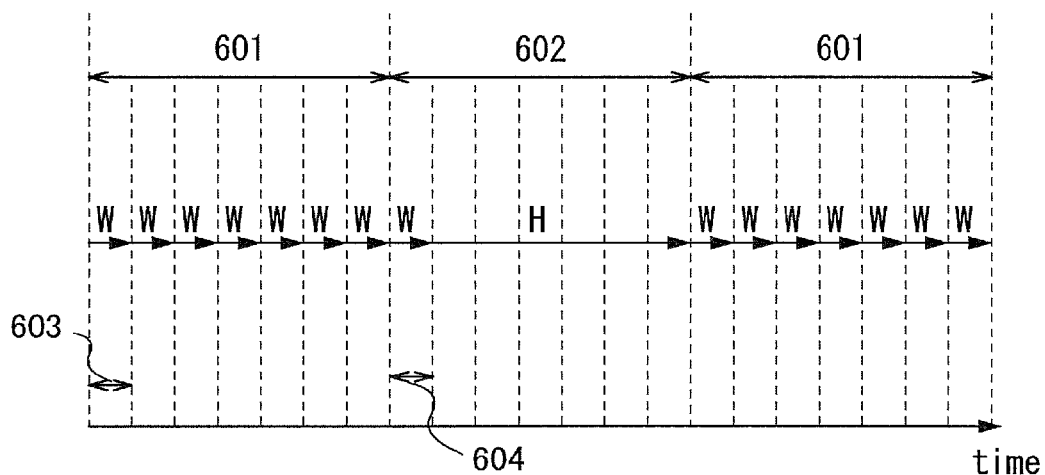
FIG. 13 illustrates one embodiment of a method for driving a liquid crystal display device.

FIG. 13 schematically illustrates writing frequency of an image signal in each frame period in a period 601 in which a moving image is displayed or in a period 602 in which a still image is displayed. In FIG. 13, "W" indicates a period in which an image signal is written, and "H" indicates a period in which the image signal is held. In addition, a period 603 is one frame period in FIG. 13; however, the period 603 may be a different period.

In the structure of the liquid crystal display device of this embodiment, an image signal of a still image displayed in the period 602 is written in a period 604, and the image signal written in the period 604 is held in the other periods of the period 602.

In the liquid crystal display device described in this embodiment as an example, writing frequency of an image signal in a period in which a still image is displayed can be reduced. As a result, power consumption at the time of displaying a still image can be reduced.

In the case where a still image is displayed by rewriting the same image plural times, visible switching of the images may cause eyestrain. The writing frequency of an image signal is reduced in the liquid crystal display device of this embodiment, which is effective in reducing eyestrain.

In particular, in the liquid crystal display device of this embodiment, a transistor having low off-state current is applied to each pixel and a switching element of the common electrode, whereby a period (the length of time) in which a storage capacitor can hold voltage can be extended. As a result, the writing frequency of an image signal can be remarkably reduced, which is significantly effective in reducing power consumption and eyestrain when a still image is displayed.

The liquid crystal element having the electrode layer structure and using polymer dispersed liquid crystal (PDLC), which is described in Embodiment 1 or 2, is applied to the liquid crystal element. In the liquid crystal display device described in Embodiment 1 or 2, improvement in contrast ratio and reduction in power consumption can be achieved.

A liquid crystal display device having higher visibility and image quality can be provided.

Further, since an alignment film and a polarizing plate are not necessarily provided in a liquid crystal display device using polymer dispersed liquid crystal, light is not absorbed by the alignment film and the polarizing plate; thus, a bright display screen with higher luminance can be obtained. High light use efficiency leads to reduction in power consumption of the liquid crystal display device. Steps and cost for providing the alignment film and the polarizing plate can be reduced, and thus higher throughput and lower cost can be realized. In addition, rubbing treatment is unnecessary because an alignment film is not provided; accordingly, dielectric breakdown caused by the rubbing treatment can be prevented and defects and damage of the liquid crystal display device can be reduced in the manufacturing process. Thus, the liquid crystal display device can be manufactured with high yield and productivity thereof can be improved.

Embodiment 4

In this embodiment, an example of a transistor that can be applied to a liquid crystal display device disclosed in this specification will be described. There is no particular limitation on the structure of the transistor that can be applied to a liquid crystal display device disclosed in this specification. For example, a top-gate staggered structure, a bottom-gate staggered structure, a top-gate planar structure, a bottom-gate planar structure, or the like can be used. Further, the transistor may have a single-gate structure including one channel formation region, a double-gate structure including two channel formation regions, or a triple-gate structure including three channel formation regions. The transistor may have a dual-gate structure including two gate electrode layers positioned over and below a channel region with a gate insulating layer provided therebetween. Examples of cross-sectional structures of transistors are illustrated in FIGS. 7A to 7D.

Figure 7A:
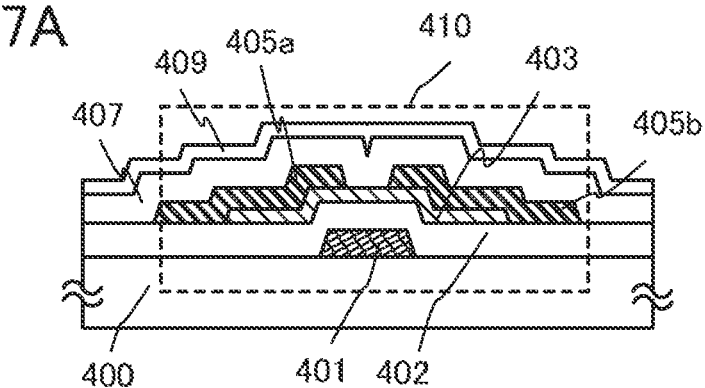
FIGS. 7A to 7D illustrate embodiments of a transistor that can be applied to a liquid crystal display device.

A transistor 410 illustrated in FIG. 7A is one of bottom-gate thin film transistors and is also referred to as an inverted staggered thin film transistor.

The transistor 410 includes, over a substrate 400 having an insulating surface, the gate electrode layer 401, the gate insulating layer 402, the semiconductor layer 403, the source electrode layer 405a, and the drain electrode layer 405b. The insulating film 407 is provided to cover the transistor 410 and be stacked over the semiconductor layer 403. The insulating layer 409 is formed over the insulating film 407.

Figure 7B:
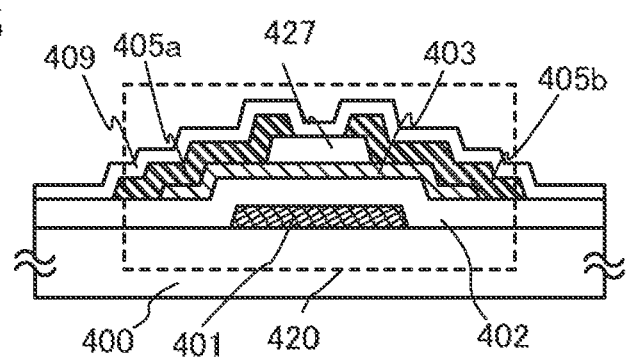

A transistor 420 illustrated in FIG. 7B is one of bottom-gate thin film transistors called a channel-protective type (also referred to as a channel-stop type) and is also referred to as an inverted staggered thin film transistor.

The transistor 420 includes, over the substrate 400 having an insulating surface, the gate electrode layer 401, the gate insulating layer 402, the semiconductor layer 403, an insulating layer 427 which functions as a channel protective layer covering a channel formation region of the semiconductor layer 403, the source electrode layer 405a, and the drain electrode layer 405b. The insulating layer 409 is formed to cover the transistor 420.

Figure 7C:
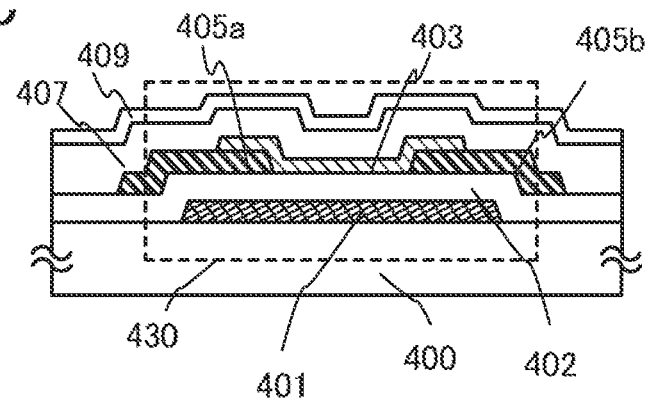

A transistor 430 illustrated in FIG. 7C is a bottom-gate thin film transistor and includes, over the substrate 400 having an insulating surface, the gate electrode layer 401, the gate insulating layer 402, the source electrode layer 405a, the drain electrode layer 405b, and the semiconductor layer 403. The insulating film 407 which covers the transistor 430 and is in contact with the semiconductor layer 403 is provided. The insulating layer 409 is provided over the insulating film 407.

In the transistor 430, the gate insulating layer 402 is provided over and in contact with the substrate 400 and the gate electrode layer 401; the source electrode layer 405a and the drain electrode layer 405b are provided over and in contact with the gate insulating layer 402. Further, the semiconductor layer 403 is provided over the gate insulating layer 402, the source electrode layer 405a, and the drain electrode layer 405b.

Figure 7D:
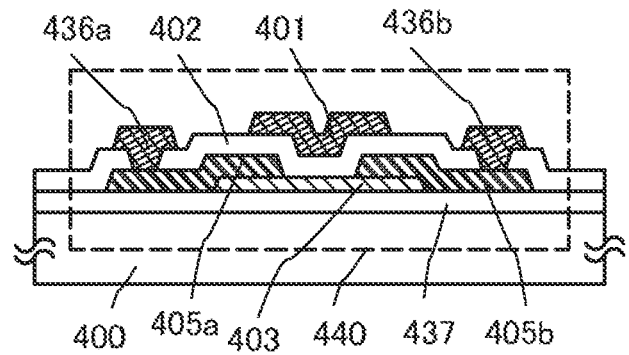

A transistor 440 illustrated in FIG. 7D is one of top-gate thin film transistors. The transistor 440 includes, over the substrate 400 having an insulating surface, an insulating layer 437, the semiconductor layer 403, the source electrode layer 405a, the drain electrode layer 405b, the gate insulating layer 402, and the gate electrode layer 401. A wiring layer 436a and a wiring layer 436b are provided to be in contact with and electrically connected to the source electrode layer 405a and the drain electrode layer 405b, respectively.

Although there is no particular limitation on a substrate that can be used as the substrate 400 having an insulating surface, a glass substrate of barium borosilicate glass, aluminoborosilicate glass, or the like is used.

In the bottom-gate transistors 410, 420, and 430, an insulating film serving as a base film may be provided between the substrate and the gate electrode layer. The base film has a function of preventing diffusion of an impurity element from the substrate and can be formed to have a single-layer structure or a stacked-layer structure using one or more of a silicon nitride film, a silicon oxide film, a silicon nitride oxide film, and a silicon oxynitride film.

The gate electrode layer 401 can be formed to have a single-layer structure or a stacked-layer structure using a metal material such as molybdenum, titanium, chromium, tantalum, tungsten, aluminum, copper, neodymium, or scandium, or an alloy material including any of these as a main component.

The gate insulating layer 402 can be formed to have a single-layer structure or a stacked-layer structure using any of a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, and a hafnium oxide layer by a plasma CVD method, a sputtering method, or the like. For example, by a plasma CVD method, a silicon nitride layer ($SiN_y$ (y>0)) with a thickness of greater than or equal to 50 nm and less than or equal to 200 nm is formed as a first gate insulating layer, and a silicon oxide layer ($SiO_x$ (x>0)) with a thickness of greater than or equal to 5 nm and less than or equal to 300 nm is formed as a second gate insulating layer over the first gate insulating layer, so that a gate insulating layer with a total thickness of 200 nm is formed.

For a conductive film used for the source electrode layer 405a and the drain electrode layer 405b, for example, an element selected from Al, Cr, Cu, Ta, Ti, Mo, and W, an alloy including any of these elements as a component, an alloy including any of these elements in combination, or the like can be used. Alternatively, a structure may be employed in which a high-melting-point metal layer of Ti, Mo, W, or the like is stacked on one or both of a top surface and a bottom surface of a metal layer of Al, Cu, or the like. When an Al material to which an element (such as Si, Nd, or Sc) which prevents generation of hillocks and whiskers in an Al film is added is used, heat resistance can be improved.

A material similar to that for the source electrode layer 405a and the drain electrode layer 405b can be used for a conductive film used for the wiring layer 436a and the wiring layer 436b which are respectively connected to the source electrode layer 405a and the drain electrode layer 405b.

Alternatively, the conductive film to be the source electrode layer 405a and the drain electrode layer 405b (including a wiring layer formed using the same layer as the source electrode layer 405a and the drain electrode layer 405b) may be formed using a conductive metal oxide. As the conductive metal oxide, indium oxide ($In_2O_3$), tin oxide ($SnO_2$), zinc oxide (ZnO), indium oxide-tin oxide alloy ($In_2O_3$—$SnO_2$; abbreviated to ITO), indium oxide-zinc oxide alloy ($In_2O_3$—ZnO), or any of these metal oxide materials including silicon oxide can be used.

As the insulating films 407, 427, and 437, typically, an inorganic insulating film such as a silicon oxide film, a silicon oxynitride film, an aluminum oxide film, or an aluminum oxynitride film can be used.

For the insulating layer 409, an inorganic insulating film such as a silicon nitride film, an aluminum nitride film, a silicon nitride oxide film, or an aluminum nitride oxide film can be used.

In addition, a planarization insulating film may be formed over the insulating layer 409 in order to reduce surface unevenness due to the transistor. For the planarization insulating film, an organic material such as polyimide, acrylic, or benzocyclobutene can be used. Other than such organic materials, it is also possible to use a low-dielectric constant material (a low-k material) or the like. Note that the planarization insulating film may be formed by stacking plural insulating films formed using any of these materials.

This embodiment can be implemented in an appropriate combination with any of the structures described in the other embodiments.

Embodiment 5

An oxide semiconductor will be described as an example which can be used for the semiconductor layers of the transistors in Embodiments 2 to 4.

In the transistors 410, 420, 430, and 440 illustrated in FIGS. 7A to 7D of Embodiment 4, an oxide semiconductor layer can be used as the semiconductor layer 403.

As an oxide semiconductor used for the semiconductor layer 403, the following can be used: an In—Sn—Ga—Zn—O-based oxide semiconductor which is a four-component metal oxide; an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, or a Sn—Al—Zn—O-based oxide semiconductor, which is a three-component metal oxide; an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, an In—Mg—O-based oxide semiconductor, or an In—Ga—O-based material, which is a two-component metal oxide; an In—O-based oxide semiconductor, a Sn—O-based oxide semiconductor, a Zn—O-based oxide semiconductor; or the like. Further, $SiO_2$ may be included in the above oxide semiconductor. In this specification, for example, an In—Ga—Zn—O-based oxide semiconductor means an oxide film including indium (In), gallium (Ga), and zinc (Zn), and there is no particular limitation on the composition ratio. The In—Ga—Zn—O-based oxide semiconductor may include an element other than In, Ga, and Zn.

For the oxide semiconductor layer, a thin film expressed by the chemical formula, $InMO_3(ZnO)_m$ (m>0) can be used. Here, M represents one or more metal elements selected from Ga, Al, Mn, and Co. For example, M can be Ga, Ga and Al, Ga and Mn, Ga and Co, or the like.

In the case where an In—Zn—O-based material is used as the oxide semiconductor, the atomic ratio thereof is In/Zn=0.5 to 50, preferably In/Zn=1 to 20, further preferably In/Zn=1.5 to 15. When the atomic ratio of Zn is in the above preferred range, the field-effect mobility of a transistor can be improved. Here, when the atomic ratio of the compound is In:Zn:O=X:Y:Z, the relation Z>1.5X+Y is satisfied.

As the oxide semiconductor used for the semiconductor layer 403, an oxide semiconductor including indium, an oxide semiconductor including indium and gallium, or the like can be favorably used.

In the transistors 410, 420, 430, and 440 each including an oxide semiconductor layer, current in an off state (off-state current) can be reduced. Therefore, in the case where the driving method described in Embodiment 4 is employed and a transistor including an oxide semiconductor layer is used as the transistor 144 in FIG. 10, an electric signal such as an image signal can be held for a longer time and a writing interval can be set longer when the power is on. Consequently, the frequency of refresh operation can be reduced, which leads to an effect of further suppressing power consumption.

In addition, the transistors 410, 420, 430, and 440 each including an oxide semiconductor layer as the semiconductor layer 403 can have relatively high field-effect mobility and thus can operate at high speed. Accordingly, by using any of the transistors in a pixel portion of a liquid crystal display device, a high-quality image can be provided. By using such transistors, a driver circuit portion and a pixel portion can be separately formed over one substrate; thus, the number of components of the liquid crystal display device can be reduced.

This embodiment can be implemented in an appropriate combination with any of the structures described in the other embodiments.

Embodiment 6

In this embodiment, another example of a transistor including an oxide semiconductor layer and an example of a manufacturing method thereof will be described in detail with reference to FIGS. 8A to 8E. The same portions as the above embodiment or portions having functions similar to those of the above embodiment can be formed in a manner similar to that of the above embodiment; therefore, repetitive description thereof is omitted. In addition, detailed description of the same portions is not repeated.

FIGS. 8A to 8E illustrate an example of a cross-sectional structure of a transistor. A transistor 510 illustrated in FIGS. 8A to 8E is a bottom-gate inverted staggered thin film transistor which is similar to the transistor 410 illustrated in FIG. 7A.

An oxide semiconductor used for a semiconductor layer in this embodiment is made to be an i-type (intrinsic) oxide semiconductor or a substantially i-type (intrinsic) oxide semiconductor by being purified by removing hydrogen, which is an n-type impurity, from an oxide semiconductor so that impurities that are not main components of the oxide semiconductor are included as little as possible. In other words, the oxide semiconductor of this embodiment is an oxide semiconductor which is made to be a purified i-type (intrinsic) semiconductor or a semiconductor close thereto not by addition of an impurity but by removal of an impurity such as hydrogen or water as much as possible. In this manner, the Fermi level (Ef) can be equal to the intrinsic Fermi level (E1). Therefore, the oxide semiconductor layer included in the transistor 510 is an oxide semiconductor layer which is purified and made electrically i-type (intrinsic).

In addition, a purified oxide semiconductor includes extremely few carriers (close to zero), and the carrier concentration thereof is lower than $1\times10^{14}/cm^3$, preferably lower than $1\times10^{12}/cm^3$, further preferably lower than $1\times10^{11}/cm^3$.

Since the oxide semiconductor includes extremely few carriers, the off-state current can be reduced in the transistor. It is preferable that the off-state current be as low as possible.

Specifically, in the transistor 510 including the above oxide semiconductor layer, current in an off state (off-state current) per micrometer in channel width can be reduced to lower than 10 zA/μm and can be further reduced to lower than 100 zA/μm at 85° C.

With the transistor whose current in an off-state (off-state current) is extremely low used as a transistor in the pixel portion of Embodiment 4, refresh operation in a still image region can be performed with a small number of times of image-data writing.

In addition, in the transistor 510 including the above oxide semiconductor layer, the temperature dependence of on-state current is hardly observed, and the off-state current remains extremely low. Further, transistor characteristics hardly change owing to light deterioration.

Steps of manufacturing the transistor 510 over a substrate 505 will be described below with reference to FIGS. 8A to 8E.

First, a conductive film is formed over the substrate 505 having an insulating surface, and then a gate electrode layer 511 is formed in a first photolithography step. Note that a resist mask may be formed by an ink-jet method. Formation of the resist mask by an ink-jet method needs no photomask; thus, manufacturing cost can be reduced.

As the substrate 505 having an insulating surface, a substrate similar to the substrate 400 described in the above embodiment can be used. In this embodiment, a glass substrate is used as the substrate 505.

An insulating film serving as a base film may be provided between the substrate 505 and the gate electrode layer 511. The base film has a function of preventing diffusion of an impurity element from the substrate 505 and can be formed to have a single-layer structure or a stacked-layer structure using any of a silicon nitride film, a silicon oxide film, a silicon nitride oxide film, and a silicon oxynitride film.

The gate electrode layer 511 can be formed to have a single-layer structure or stacked-layer structure using a metal material such as molybdenum, titanium, tantalum, tungsten, aluminum, copper, neodymium, or scandium, or an alloy material including any of these as a main component.

Next, a gate insulating layer 507 is formed over the gate electrode layer 511. The gate insulating layer 507 can be formed to have a single-layer structure or a stacked-layer structure using any of a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, a hafnium oxide layer, and a gallium oxide layer by a plasma CVD method, a sputtering method, or the like.

As the oxide semiconductor in this embodiment, an oxide semiconductor which is made i-type or substantially i-type by removal of an impurity is used. Such a purified oxide semiconductor is highly sensitive to an interface state and interface charge; thus, an interface between the oxide semiconductor layer and the gate insulating layer is important. For that reason, the gate insulating layer that is to be in contact with the purified oxide semiconductor needs to have high quality.

For example, high-density plasma CVD using microwaves (e.g., with a frequency of 2.45 GHz) is preferably employed because a dense insulating layer having high withstand voltage and high quality can be formed. The purified oxide semiconductor and the high-quality gate insulating layer are in close contact with each other, whereby the interface states can be reduced to obtain favorable interface characteristics.

Needless to say, another film formation method such as a sputtering method or a plasma CVD method can be employed as long as the method enables formation of a high-quality insulating layer as a gate insulating layer. Further, an insulating layer whose film quality and characteristic of the interface with an oxide semiconductor are improved by heat treatment performed after formation of the insulating layer may be formed as a gate insulating layer. In any case, an insulating layer that can reduce interface state density of an interface between an oxide semiconductor and the insulating layer to form a favorable interface, as well as having favorable film quality as a gate insulating layer, is formed.

Further, in order that hydrogen, hydroxyl group, and moisture are included as little as possible in the gate insulating layer 507 and an oxide semiconductor film 530, it is preferable that the substrate 505 over which the gate electrode layer 511 is formed or the substrate 505 over which components up to and including the gate insulating layer 507 are formed be preheated in a preheating chamber of a sputtering apparatus as pretreatment for the formation of the oxide semiconductor film 530 to eliminate and remove impurities such as hydrogen and moisture adsorbed to the substrate 505. As an evacuation unit provided in the preheating chamber, a cryopump is preferable. Note that this preheating treatment can be omitted. Further, this preheating may be performed in a similar manner on the substrate 505 over which components up to and including a source electrode layer 515a and a drain electrode layer 515b are formed, before formation of an insulating layer 516.

Figure 8A:
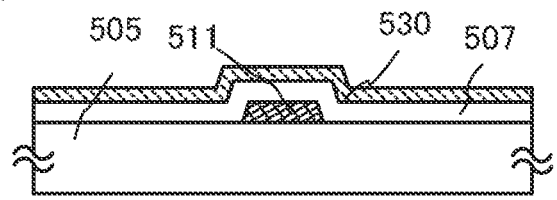
FIGS. 8A to 8E illustrate one embodiment of a transistor that can be applied to a liquid crystal display device and one embodiment of a method for manufacturing the transistor.
Figure 8B:
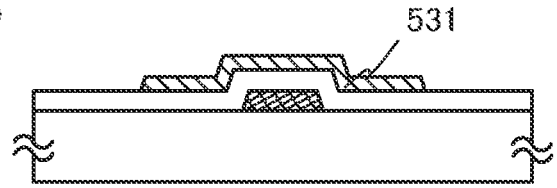
Figure 8C:
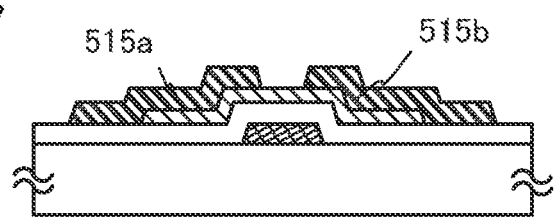

Next, the oxide semiconductor film 530 having a thickness greater than or equal to 2 nm and less than or equal to 200 nm, preferably greater than or equal to 5 nm and less than or equal to 30 nm, is formed over the gate insulating layer 507 (see FIG. 8A).

Note that before the oxide semiconductor film 530 is formed by a sputtering method, powder substances (also referred to as particles or dust) attached to a surface of the gate insulating layer 507 are preferably removed by reverse sputtering in which an argon gas is introduced and plasma is generated. The reverse sputtering refers to a method in which, without application of voltage to a target side, an RF power source is used for voltage application to a substrate side in an argon atmosphere to generate plasma in the vicinity of the substrate so that a surface is modified. Note that instead of an argon atmosphere, a nitrogen atmosphere, a helium atmosphere, an oxygen atmosphere, or the like may be used.

As an oxide semiconductor used for the oxide semiconductor film 530, an oxide semiconductor described in Embodiment 5, such as a four component metal oxide, a three-component metal oxide, a two-component metal oxide, an In—O-based oxide semiconductor, a Sn—O-based oxide semiconductor, or a Zn—O-based oxide semiconductor, can be used. Further, $SiO_2$ may be included in the above oxide semiconductor. In this embodiment, the oxide semiconductor film 530 is formed by a sputtering method with the use of an In—Ga—Zn—O-based oxide target. A cross-sectional view at this stage is illustrated in FIG. 8A. Alternatively, the oxide semiconductor film 530 can be formed by a sputtering method in a rare gas (typically argon) atmosphere, an oxygen atmosphere, or a mixed atmosphere of a rare gas and oxygen.

As the target for forming the oxide semiconductor film 530 by a sputtering method, for example, an oxide target having a composition ratio of $In_2O_3:Ga_2O_3:ZnO=1:1:1$ [molar ratio] is used, so that an In—Ga—Zn—O film is formed. Without limitation on the material and the component of the target, for example, an oxide target having a composition ratio of $In_2O_3:Ga_2O_3:ZnO=1:1:2$ [molar ratio] may be used. The filling rate of the oxide target is higher than or equal to 90% and lower than or equal to 100%, preferably higher than or equal to 95% and lower than or equal to 99.9%. With the use of a metal oxide target having a high filling rate, the formed oxide semiconductor film has high density.

It is preferable that a high-purity gas from which an impurity such as hydrogen, water, hydroxyl group, or hydride is removed be used as a sputtering gas used for the formation of the oxide semiconductor film 530.

The substrate is held in a deposition chamber kept under reduced pressure, and the substrate temperature is set to a temperature higher than or equal to 100° C. and lower than or equal to 600° C., preferably higher than or equal to 200° C. and lower than or equal to 400° C. By forming the oxide semiconductor film in a state where the substrate is heated, the concentration of an impurity included in the formed oxide semiconductor film can be reduced. In addition, damage due to sputtering can be reduced. Then, a sputtering gas from which hydrogen and moisture are removed is introduced into the deposition chamber while moisture remaining therein is removed, and the oxide semiconductor film 530 is formed over the substrate 505 with the use of the above target. In order to remove moisture remaining in the deposition chamber, an entrapment vacuum pump such as a cryopump, an ion pump, or a titanium sublimation pump is preferably used. The evacuation unit may be a turbo pump provided with a cold trap. In the deposition chamber which is evacuated with a cryopump, a hydrogen atom, a compound including a hydrogen atom, such as water ($H_2O$), (preferably, also a compound including a carbon atom), and the like are removed, whereby the concentration of an impurity in the oxide semiconductor film formed in the deposition chamber can be reduced.

As an example of the film formation condition, the distance between the substrate and the target is 100 mm, the pressure is 0.6 Pa, the direct-current (DC) power is 0.5 kW, and the atmosphere is an oxygen atmosphere (the proportion of the oxygen flow rate is 100%). Note that a pulsed direct-current power source is preferably used because powder substances (also referred to as particles or dust) that are generated in film formation can be reduced and the film thickness can be uniform.

Next, the oxide semiconductor film 530 is processed into an island-shaped oxide semiconductor layer in a second photolithography step. A resist mask for forming the island-shaped oxide semiconductor layer may be formed by an ink-jet method. Formation of the resist mask by an ink-jet method needs no photomask; thus, manufacturing cost can be reduced.

In the case where a contact hole is formed in the gate insulating layer 507, a step of forming the contact hole can be performed at the same time as processing of the oxide semiconductor film 530.

Note that etching of the oxide semiconductor film 530 may be dry etching, wet etching, or both dry etching and wet etching. As an etchant used for wet etching of the oxide semiconductor film 530, for example, a mixed solution of phosphoric acid, acetic acid, and nitric acid, an ammonium peroxide mixture (a 31 wt % hydrogen peroxide solution:28 wt % ammonia water:water=5:2:2), or the like can be used. In addition, ITO07N (produced by KANTO CHEMICAL CO., INC.) may be used.

Next, the oxide semiconductor layer is subjected to first heat treatment. The oxide semiconductor layer can be dehydrated or dehydrogenated by the first heat treatment. The temperature of the first heat treatment is higher than or equal to 400° C. and lower than or equal to 750° C., or higher than or equal to 400° C. and lower than the strain point of the substrate. Here, the substrate is put in an electric furnace which is a kind of heat treatment apparatus and heat treatment is performed on the oxide semiconductor layer at 450° C. for 1 hour in a nitrogen atmosphere, and then, the oxide semiconductor layer is not exposed to the air so that entry of water and hydrogen into the oxide semiconductor layer is prevented; thus, an oxide semiconductor layer 531 is obtained (see FIG. 8B).

The heat treatment apparatus is not limited to an electric furnace, and an apparatus for heating an object to be processed by heat conduction or heat radiation from a heating element such as a resistance heating element may be used. For example, a rapid thermal annealing (RTA) apparatus such as a gas rapid thermal annealing (GRTA) apparatus or a lamp rapid thermal annealing (LRTA) apparatus can be used. An LRTA apparatus is an apparatus for heating an object to be processed by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus for heat treatment using a high-temperature gas. As the high-temperature gas, an inert gas which does not react with an object to be processed by heat treatment, such as nitrogen or a rare gas like argon, is used.

For example, as the first heat treatment, GRTA in which the substrate is moved into an inert gas heated to a high temperature of 650° C. to 700° C., heated for several minutes, and moved out of the inert gas heated to the high temperature may be performed.

Note that in the first heat treatment, it is preferable that water, hydrogen, and the like be not included in nitrogen or a rare gas such as helium, neon, or argon. The purity of nitrogen or the rare gas such as helium, neon, or argon which is introduced into a heat treatment apparatus is preferably 6N (99.9999%) or higher, further preferably 7N (99.99999%) or higher (i.e., the concentration of an impurity is preferably 1 ppm or lower, further preferably 0.1 ppm or lower).

After the oxide semiconductor layer is heated by the first heat treatment, a high-purity oxygen gas, a high-purity $N_2O$ gas, or ultra-dry air (having a dew point lower than or equal to −40° C., preferably lower than or equal to −60° C.) may be introduced into the furnace. It is preferable that the oxygen gas and the $N_2O$ gas do not include water, hydrogen, and the like. The purity of the oxygen gas or the $N_2O$ gas which is introduced into the heat treatment apparatus is preferably 6N or higher, further preferably 7N or higher (i.e., the concentration of an impurity in the oxygen gas or the $N_2O$ gas is preferably 1 ppm or lower, further preferably 0.1 ppm or lower). Oxygen which is a main component of an oxide semiconductor and has been reduced through the step of removing impurities by the dehydration or dehydrogenation treatment is supplied by the action of the oxygen gas or the $N_2O$ gas, whereby the oxide semiconductor layer is purified and made electrically i-type (intrinsic).

In addition, the first heat treatment for the oxide semiconductor layer can also be performed on the oxide semiconductor film 530 which has not been processed into the island-shaped oxide semiconductor layer. In that case, the substrate is taken out from the heating apparatus after the first heat treatment, and then a photolithography step is performed.

Note that the first heat treatment may be performed at either of the following timings without limitation to the above timing as long as it is performed after the oxide semiconductor layer is formed: after a source electrode layer and a drain electrode layer are formed over the oxide semiconductor layer; and after an insulating layer is formed over the source electrode layer and the drain electrode layer.

In the case where a contact hole is formed in the gate insulating layer 507, a step of forming the contact hole may be performed before or after the first heat treatment is performed on the oxide semiconductor film 530.

In addition, as the oxide semiconductor layer, an oxide semiconductor layer having a crystal region with a large thickness (a single crystal region), that is, a c-axis-aligned crystal region which is aligned perpendicularly to a surface of the film may be formed by performing deposition twice and heat treatment twice, regardless of the material for a base component such as an oxide, a nitride, or a metal. For example, a first oxide semiconductor film having a thickness greater than or equal to 3 nm and less than or equal to 15 nm is formed and then first heat treatment is performed at a temperature higher than or equal to 450° C. and lower than or equal to 850° C., preferably higher than or equal to 550° C. and lower than or equal to 750° C. in an atmosphere of nitrogen, oxygen, a rare gas, or dry air, whereby a first oxide semiconductor film which includes a crystal region (including plate-like crystals) in a region including a surface is formed. Then, a second oxide semiconductor film which is thicker than the first oxide semiconductor film is formed and then second heat treatment is performed at a temperature higher than or equal to 450° C. and lower than or equal to 850° C., preferably higher than or equal to 600° C. and lower than or equal to 700° C., so that crystal growth proceeds upward with the use of the first oxide semiconductor film as a seed of the crystal growth, whereby the whole second oxide semiconductor film is crystallized. In such a manner, an oxide semiconductor layer which includes a thick crystal region may be formed.

Next, a conductive film which serves as a source electrode layer and a drain electrode layer (including a wiring formed using the same layer as the source electrode layer and the drain electrode layer) is formed over the gate insulating layer 507 and the oxide semiconductor layer 531. For the conductive film used for the source electrode layer and the drain electrode layer, the material used for the source electrode layer 405a and the drain electrode layer 405b, which is described in the above embodiment can be used.

In a third photolithography step, a resist mask is formed over the conductive film and etching is performed selectively, so that the source electrode layer 515a and the drain electrode layer 515b are formed. After that, the resist mask is removed (see FIG. 8C).

Light exposure at the time of forming the resist mask in the third photolithography step is preferably performed using ultraviolet light, KrF laser light, or ArF laser light. A channel length L of the transistor that is completed later is determined by the distance between bottom ends of the source electrode layer and the drain electrode layer, which are adjacent to each other over the oxide semiconductor layer 531. In the case where the channel length L is less than 25 nm, light exposure for formation of the resist mask in the third photolithography step is preferably performed using extreme ultraviolet light having an extremely short wavelength of several nanometers to several tens of nanometers. In the light exposure with extreme ultraviolet light, the resolution is high and the focus depth is large. Accordingly, the channel length L of the transistor to be completed later can be greater than or equal to 10 nm and less than or equal to 1000 nm, and the operation speed of a circuit can increased.

In order to reduce the number of photomasks and steps in a photolithography step, etching may be performed with the use of a resist mask formed using a multi-tone mask which is a light-exposure mask through which light is transmitted so as to have a plurality of intensities. A resist mask formed using a multi-tone mask has a plurality of thicknesses and can be changed in shape by etching; therefore, the resist mask can be used in a plurality of etching steps for processing into different patterns. Therefore, a resist mask corresponding to at least two kinds of different patterns can be formed by one multi-tone mask. Thus, the number of light-exposure masks can be reduced and the number of corresponding photolithography steps can be also reduced, whereby simplification of a process can be realized.

Note that it is preferable that etching conditions be optimized so that the oxide semiconductor layer 531 is not etched and divided when the conductive film is etched. However, it is difficult to obtain conditions under which only the conductive film is etched and the oxide semiconductor layer 531 is not etched at all. Therefore, in some cases, the oxide semiconductor layer 531 is partly etched to be an oxide semiconductor layer having a groove (a depression) at the time of etching of the conductive film.

In this embodiment, since a Ti film is used as the conductive film and an In—Ga—Zn—O-based oxide semiconductor is used for the oxide semiconductor layer 531, an ammonium peroxide mixture (a mixed solution of ammonia, water, and a hydrogen peroxide solution) is used as an etchant.

Next, by plasma treatment using a gas such as $N_2O$, $N_2$, or Ar, water or the like adsorbed to a surface of an exposed portion of the oxide semiconductor layer may be removed. In the case where the plasma treatment is performed, the insulating layer 516 which serves as a protective insulating film in contact with part of the oxide semiconductor layer is formed without exposure to the air.

The insulating layer 516 can be formed to a thickness of at least 1 nm by a method by which an impurity such as water or hydrogen does not enter the insulating layer 516, such as a sputtering method as appropriate. When hydrogen is included in the insulating layer 516, entry of hydrogen to the oxide semiconductor layer, or extraction of oxygen in the oxide semiconductor layer by hydrogen may occur, thereby causing a backchannel of the oxide semiconductor layer to have lower resistance (to be n-type), so that a parasitic channel might be formed. Therefore, it is important that a formation method in which hydrogen is not used be employed so that the insulating layer 516 includes hydrogen as little as possible.

In this embodiment, a silicon oxide film is formed to a thickness of 200 nm as the insulating layer 516 by a sputtering method. The substrate temperature in film formation may be higher than or equal to room temperature and lower than or equal to 300° C., and is 100° C. in this embodiment. The silicon oxide film can be formed by a sputtering method in a rare gas (typically argon) atmosphere, an oxygen atmosphere, or a mixed atmosphere including a rare gas and oxygen. As a target, a silicon oxide target or a silicon target can be used. For example, the silicon oxide film can be formed using a silicon target by a sputtering method in an atmosphere including oxygen. As the insulating layer 516 which is formed in contact with the oxide semiconductor layer, an inorganic insulating film which does not include impurities such as moisture, a hydrogen ion, and $OH^-$ and blocks entry of these from the outside is used. Typically, a silicon oxide film, a silicon oxynitride film, an aluminum oxide film, an aluminum oxynitride film, a gallium oxide film, or the like is used.

As in the case of forming the oxide semiconductor film 530, an entrapment vacuum pump (such as a cryopump) is preferably used in order to remove moisture remaining in a deposition chamber used for forming the insulating layer 516. The insulating layer 516 is formed in a deposition chamber which is evacuated with a cryopump, whereby the concentration of an impurity in the insulating layer 516 can be reduced. A turbo pump provided with a cold trap may be used as an evacuation unit for removing moisture remaining in the deposition chamber used for forming the insulating layer 516.

It is preferable that a high-purity gas from which an impurity such as hydrogen, water, hydroxyl group, or hydride is removed be used as a sputtering gas for the formation of the insulating layer 516.

Next, second heat treatment (preferably at a temperature higher than or equal to 200° C. and lower than or equal to 400° C., for example, at a temperature higher than or equal to 250° C. and lower than or equal to 350° C.) is performed in an inert gas atmosphere or an oxygen gas atmosphere. For example, the second heat treatment is performed at 250° C. for 1 hour in a nitrogen atmosphere. In the second heat treatment, part of the oxide semiconductor layer (a channel formation region) is heated while being in contact with the insulating layer 516.

As described above, the first heat treatment is performed on the oxide semiconductor film, whereby an impurity such as hydrogen, moisture, hydroxyl group, or hydride (also referred to as a hydrogen compound) can be intentionally eliminated from the oxide semiconductor layer and oxygen which is one of main components of the oxide semiconductor and has been reduced through the step of removing the impurities can be supplied. Accordingly, the oxide semiconductor layer is purified and made electrically i-type (intrinsic).

Figure 8D:
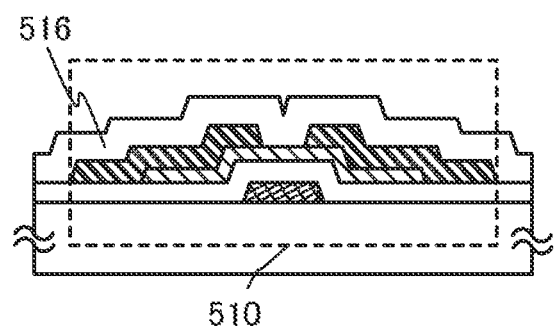
Figure 8E:
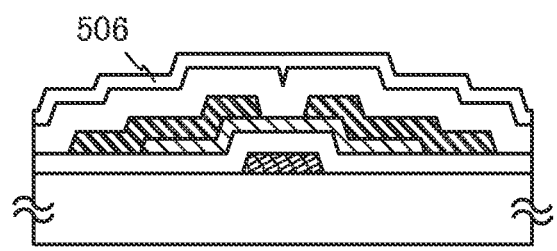

Through the above steps, the transistor 510 is manufactured (see FIG. 8D).

When a silicon oxide layer having a lot of defects is used as the insulating layer 516, heat treatment after formation of the silicon oxide layer has an effect in diffusing an impurity such as hydrogen, moisture, hydroxyl group, or hydride included in the oxide semiconductor layer to the oxide insulating layer so that the impurity included in the oxide semiconductor layer can be further reduced.

A protective insulating layer 506 may be additionally formed over the insulating layer 516. For example, a silicon nitride film is formed by an RF sputtering method. The RF sputtering method is preferable as a formation method of the protective insulating layer because it achieves high mass productivity. As the protective insulating layer, an inorganic insulating film which does not include impurities such as moisture and blocks entry of the impurities from the outside is used; for example, a silicon nitride film, an aluminum nitride film, or the like is used. In this embodiment, a silicon nitride film is used as the protective insulating layer 506 (see FIG. 8E).

In this embodiment, as the protective insulating layer 506, a silicon nitride film is formed by heating the substrate 505 over which components up to and including the insulating layer 516 are formed to a temperature of 100° C. to 400° C., introducing a sputtering gas including high-purity nitrogen from which hydrogen and moisture are removed, and using a target of a silicon semiconductor. In this case, the protective insulating layer 506 is preferably formed while moisture remaining in a treatment chamber is removed, as in the case of the insulating layer 516.

After the formation of the protective insulating layer, heat treatment may be further performed at a temperature higher than or equal to 100° C. and lower than or equal to 200° C. in the air for longer than or equal to 1 hour and shorter than or equal to 30 hours. This heat treatment may be performed at a fixed heating temperature. Alternatively, the following change in the heating temperature may be conducted plural times repeatedly: the heating temperature is raised from room temperature to a temperature higher than or equal to 100° C. and lower than or equal to 200° C. and then lowered to room temperature.

As described above, the transistor including the purified oxide semiconductor layer, which is manufactured in accordance with this embodiment, is used, whereby current in an off state (off-state current) can be further reduced. Accordingly, in a driving method like that described in Embodiment 4, an electric signal such as an image signal can be held for a longer time and a writing interval can be set longer. Consequently, the frequency of refresh operation can be reduced, which leads to a higher effect of suppressing power consumption.

The size of a storage capacitor formed in a liquid crystal display device is set considering the leakage current or the like of a transistor provided in a pixel portion so that electric charge can be held for an appropriate period. The size of the storage capacitor may be set considering the off-state current or the like of the transistor. In the case where the transistor including a high-purity oxide semiconductor layer described in this embodiment is used, it is satisfactory to provide a storage capacitor having capacitance which is less than or equal to ⅓, preferably less than or equal to ⅕ with respect to the liquid crystal capacitance of each pixel.

In addition, since the transistor including a purified oxide semiconductor layer has high field-effect mobility, high-speed operation is possible. Accordingly, by using the transistor in a pixel portion of a liquid crystal display device, a high-quality image can be provided. Accordingly, by using the transistor in a pixel portion of a liquid crystal display device, a high-quality image can be provided. By using the transistor, a driver circuit portion and a pixel portion can be separately formed over one substrate; thus, the number of components of the liquid crystal display device can be reduced.

This embodiment can be implemented in an appropriate combination with any of the structures described in the other embodiments.

Embodiment 7

An example of another material which can be used for the semiconductor layers of the transistors in Embodiments 1 to 4 will be described.

A semiconductor layer included in a semiconductor element can be formed using any of the following materials: an amorphous semiconductor (hereinafter also referred to as an "AS") formed by a vapor deposition method using a semiconductor material gas typified by silane or germane or by a sputtering method; a polycrystalline semiconductor formed by crystallizing the amorphous semiconductor by utilizing light energy or thermal energy; a microcrystalline semiconductor; and the like. The semiconductor layer can be formed by a sputtering method, an LPCVD method, a plasma CVD method, or the like.

A microcrystalline semiconductor film can be formed by a high-frequency plasma CVD method with a frequency of several tens of megahertz to several hundreds of megahertz or a microwave plasma CVD apparatus with a frequency of 1 GHz or higher. Typically, the microcrystalline semiconductor film can be formed using silicon hydride such as $SiH_4$, $Si_2H_6$, $SiH_2Cl_2$, $SiHCl_3$, $SiCl_4$, or $SiF_4$, which is diluted with hydrogen. Alternatively, the microcrystalline semiconductor film can be formed using a gas including silicon hydride and hydrogen which is diluted with one or more rare gas elements selected from helium, argon, krypton, and neon. In that case, the flow ratio of hydrogen to silicon hydride is 5:1 to 200:1, preferably 50:1 to 150:1, further preferably 100:1.

A typical example of an amorphous semiconductor is hydrogenated amorphous silicon, while a typical example of a crystalline semiconductor is polysilicon or the like. Examples of polysilicon (polycrystalline silicon) include so-called high-temperature polysilicon which includes polysilicon formed at a process temperature higher than or equal to 800° C. as a main component, so-called low-temperature polysilicon which includes polysilicon formed at a process temperature lower than or equal to 600° C. as a main component, polysilicon obtained by crystallizing amorphous silicon with the use of an element that promotes crystallization or the like, and the like. Needless to say, as described above, a microcrystalline semiconductor, or a semiconductor which includes a crystalline phase in part of a semiconductor layer can be used.

In the case of using a crystalline semiconductor film for the semiconductor layer, the crystalline semiconductor film may be formed by various methods (such as a laser crystallization method, a thermal crystallization method, or a thermal crystallization method using an element that promotes crystallization, such as nickel). Further, when a microcrystalline semiconductor is crystallized by laser irradiation, crystallinity thereof can be enhanced. In the case where an element that promotes crystallization is not used, before an amorphous silicon film is irradiated with laser light, the amorphous silicon film is heated at 500° C. for 1 hour in a nitrogen atmosphere so that the concentration of hydrogen included in the amorphous silicon film becomes lower than or equal to $1\times10^{20}$ atoms/cm$^3$. This is because, if the amorphous silicon film includes much hydrogen, the amorphous silicon film would be destroyed by laser irradiation.

There is no particular limitation on a method for introducing a metal element into the amorphous semiconductor film as long as the metal element can exist on a surface or the inside of the amorphous semiconductor film. For example, a sputtering method, a CVD method, a plasma treatment method (including a plasma CVD method), an adsorption method, or a method in which a metal salt solution is applied can be employed. Among them, the method using a solution is simple and advantageous in that the concentration of the metal element can be easily controlled. At this time, an oxide film is preferably formed by UV light irradiation in an oxygen atmosphere, thermal oxidation, treatment with ozone water or hydrogen peroxide including a hydroxyl radical, or the like in order to improve the wettability of the surface of the amorphous semiconductor film and to spread an aqueous solution on the entire surface of the amorphous semiconductor film.

In a crystallization step in which an amorphous semiconductor film is crystallized to form a crystalline semiconductor film, an element that promotes crystallization (also referred to as a catalytic element or a metal element) may be added to the amorphous semiconductor film, and crystallization may be performed by heat treatment (at 550° C. to 750° C. for 3 minutes to 24 hours). As the element that promotes (accelerates) crystallization, one or more elements selected from iron (Fe), nickel (Ni), cobalt (Co), ruthenium (Ru), rhodium (Rh), palladium (Pd), osmium (Os), iridium (Ir), platinum (Pt), copper (Cu), and gold (Au) can be used.

In order to remove or reduce the element that promotes crystallization from the crystalline semiconductor film, a semiconductor film including an impurity element is formed in contact with the crystalline semiconductor film so as to function as a gettering sink. The impurity element may be an impurity element imparting n-type conductivity, an impurity element imparting p-type conductivity, a rare gas element, or the like. For example, one or more elements selected from phosphorus (P), nitrogen (N), arsenic (As), antimony (Sb), bismuth (Bi), boron (B), helium (He), neon (Ne), argon (Ar), krypton (Kr), and xenon (Xe) can be used. A semiconductor film including a rare gas element is formed over the crystalline semiconductor film including the element that promotes crystallization, and then heat treatment is performed (at 550° C. to 750° C. for 3 minutes to 24 hours). The element that promotes crystallization included in the crystalline semiconductor film moves into the semiconductor film including a rare gas element, and thus the element that promotes crystallization included in the crystalline semiconductor film is removed or reduced. After that, the semiconductor film including a rare gas element, which serves as the gettering sink, is removed.

The amorphous semiconductor film may be crystallized by a combination of heat treatment and laser light irradiation. Alternatively, either heat treatment or laser light irradiation may be performed plural times.

A crystalline semiconductor film may be formed directly over a substrate by a plasma method. Alternatively, a crystalline semiconductor film may be selectively formed over the substrate by a plasma method.

This embodiment can be implemented in an appropriate combination with any of the structures described in the other embodiments.

Embodiment 8

Figure 5A:
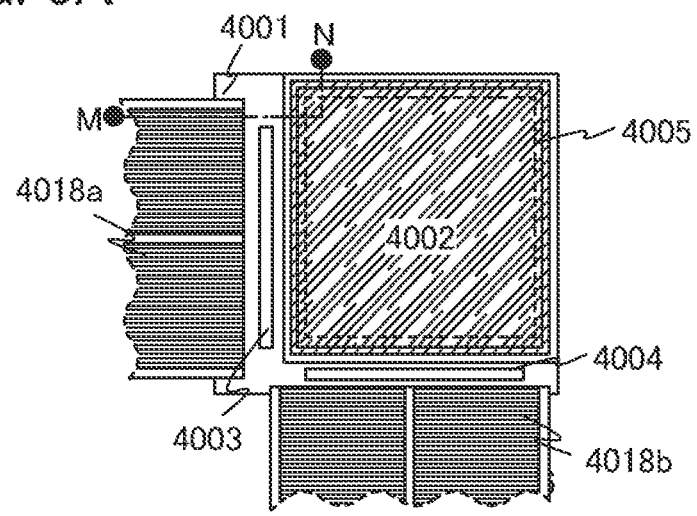
FIGS. 5A to 5C illustrate embodiments of a liquid crystal display module.
Figure 5B:
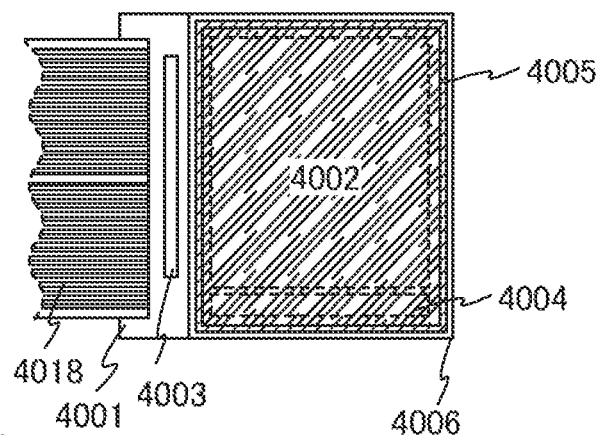
Figure 5C:
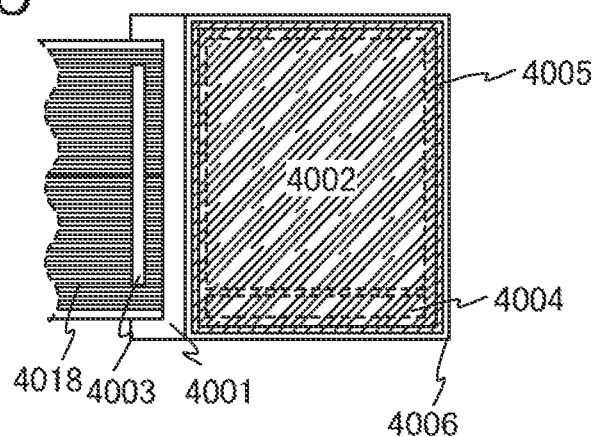
Figure 6:
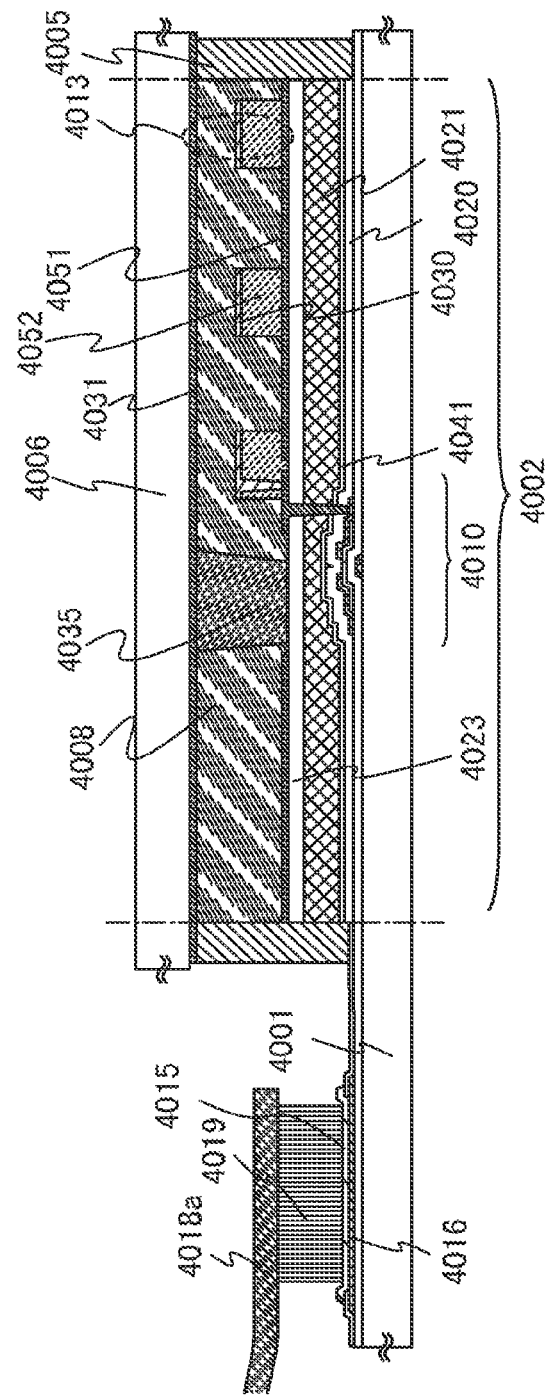
FIG. 6 illustrates one embodiment of a liquid crystal display module.

The appearance and a cross section of a liquid crystal display device which is one embodiment of a liquid crystal display device will be described with reference to FIGS. 5A to 5C and FIG. 6. FIGS. 5A to 5C are each a top view of a liquid crystal display device in which a transistor 4010 and a liquid crystal element 4013 including a liquid crystal layer 4008, which are formed over a first substrate 4001, are sealed between the first substrate 4001 and a second substrate 4006 with a sealant 4005. FIG. 6 is a cross-sectional view taken along line M-N in FIG. 5A.

As a transistor in the liquid crystal display device disclosed in this specification, the transistor described in any of Embodiments 2 to 7 can be used. The transistor can be used for a pixel portion and a driver circuit. Some or all of the driver circuits using the transistor can be formed over a substrate where the pixel portion is formed, whereby a system-on-panel can be obtained.

In FIG. 5A, the sealant 4005 is provided so as to surround a pixel portion 4002 provided over the first substrate 4001, and the pixel portion 4002 is sealed by using the second substrate 4006. In FIG. 5A, a signal line driver circuit 4003 and a scan line driver circuit 4004 which are formed using a single crystal semiconductor film or a polycrystalline semiconductor film over a substrate separately prepared are mounted in a region that is different from the region surrounded by the sealant 4005 over the first substrate 4001. Various signals and potentials are supplied to the signal line driver circuit 4003 and the scan line driver circuit 4004 each of which is separately formed, and the pixel portion 4002 from flexible printed circuits (FPCs) 4018a and 4018b.

In FIGS. 5B and 5C, the sealant 4005 is provided so as to surround the pixel portion 4002 and the scan line driver circuit 4004 which are provided over the first substrate 4001. The second substrate 4006 is provided over the pixel portion 4002 and the scan line driver circuit 4004. Consequently, the pixel portion 4002 and the scan line driver circuit 4004 are sealed together with a display element, by the first substrate 4001, the sealant 4005, and the second substrate 4006. In FIGS. 5B and 5C, the signal line driver circuit 4003 which is formed using a single crystal semiconductor film or a polycrystalline semiconductor film over a substrate separately prepared is mounted in a region that is different from the region surrounded by the sealant 4005 over the first substrate 4001. In FIGS. 5B and 5C, various signals and potentials are supplied to the signal line driver circuit 4003 which is separately formed, the scan line driver circuit 4004, and the pixel portion 4002 from an FPC 4018.

Although FIGS. 5B and 5C each illustrate an example in which the signal line driver circuit 4003 is formed separately and mounted on the first substrate 4001, one embodiment of the invention disclosed in this specification is not limited to this structure. The scan line driver circuit may be separately formed and then mounted, or only part of the signal line driver circuit or part of the scan line driver circuit may be separately formed and then mounted.

Note that there is no particular limitation on a connection method of a separately formed driver circuit, and a chip on glass (COG) method, a wire bonding method, a tape automated bonding (TAB) method, or the like can be used. FIG. 5A illustrates an example in which the signal line driver circuit 4003 and the scan line driver circuit 4004 are mounted by a COG method. FIG. 5B illustrates an example in which the signal line driver circuit 4003 is mounted by a COG method. FIG. 5C illustrates an example in which the signal line driver circuit 4003 is mounted by a TAB method.

Further, a liquid crystal display device includes a panel in which a display element is sealed, and a module in which an IC or the like including a controller is mounted on the panel.

Note that a display device in this specification means an image display device, a display device, or a light source (including a lighting device). Furthermore, the display device also includes the following modules in its category: a module to which a connector such as an FPC, a TAB tape, or a TCP is attached; a module having a TAB tape or a TCP at the tip of which a printed wiring board is provided; and a module in which an integrated circuit (IC) is directly mounted on a display element by a COG method.

Further, the pixel portion 4002 which is provided over the first substrate 4001 and the scan line driver circuit 4004 include a plurality of transistors, and the transistor described in any of Embodiments 2 to 7 can be applied. FIG. 6 illustrates the transistor 4010 included in the pixel portion 4002, as an example.

Although not illustrated, a conductive layer may be provided over an insulating layer so as to overlap with a channel formation region of a semiconductor layer of a transistor for the driver circuit. The conductive layer is provided so as to overlap with the channel formation region of the oxide semiconductor layer, whereby the amount of shift in threshold voltage of the transistor can be reduced. In addition, the conductive layer may have the same potential as or a potential different from that of a gate electrode layer of the transistor and can function as a second gate electrode layer. The potential of the conductive layer may be GND or 0V, or the conductive layer may be in a floating state.

In addition, the conductive layer functions to block an external electric field, that is, to prevent an external electric field (particularly, to block static electricity) from affecting the inside (a circuit portion including a transistor). The blocking function of the conductive layer can prevent fluctuation in electric characteristics of the transistor due to the effect of an external electric field such as static electricity.

In FIG. 6, a connection terminal electrode 4015 is formed using the same conductive film as a pixel electrode layer 4030, and a terminal electrode 4016 is formed using the same conductive film as a source electrode layer and a drain electrode layer of the transistor 4010.

The connection terminal electrode 4015 is electrically connected to a terminal included in the FPC 4018a through an anisotropic conductive film 4019.

A columnar spacer denoted by reference numeral 4035 is obtained by selective etching of an insulating film and is provided in order to control the thickness (a cell gap) of the liquid crystal layer 4008. Alternatively, a spherical spacer may be used.

In this specification, display is performed in the liquid crystal display device by entry of outside light. Therefore, light needs to be transmitted through at least a substrate, an electrode layer, and an insulating layer, which are provided on the viewing side in a pixel region. Accordingly, the substrate and the thin films such as the insulating layer and the electrode layer which exist in the pixel region through which light is transmitted all have a light-transmitting property with respect to light in the visible wavelength range. On the other hand, an electrode layer or film having reflectivity, a coloring layer for display, and the like can be provided on a side opposite to the viewing side.

Note that the second substrate 4006 side is the viewing side of the liquid crystal display device in FIG. 6.

A second common electrode layer 4031 is formed using a light-transmitting conductive material. The pixel electrode layer 4030 and a first common electrode layer 4051 may be formed using a reflective conductive material or a light-transmitting conductive material. Further, the pixel electrode layer 4030 or the first common electrode layer 4051 may be formed using a conductive layer exhibiting black with the use of a black conductive material to function also as a black layer.

In performing white display, when the pixel electrode layer 4030 or the first common electrode layer 4051 has reflectivity, incident light is reflected to the liquid crystal layer 4008 side by the pixel electrode layer 4030 or the first common electrode layer 4051 even if the light passes through the liquid crystal layer 4008 without being scattered; thus, the light can be efficiently scattered in the liquid crystal layer 4008 and visibility of white display can be improved. On the other hand, when the pixel electrode layer 4030 or the first common electrode layer 4051 has a light-transmitting property, display using a black layer (or a coloring layer) provided under the pixel electrode layer 4030 or the first common electrode layer 4051 (on the side opposite to the viewing side) is not interrupted in the case where the liquid crystal layer 4008 is in a transparent state.

As a light-transmitting conductive material which can be used for the pixel electrode layer 4030, the first common electrode layer 4051, and the second common electrode layer 4031, for example, a light-transmitting conductive material such as indium oxide including tungsten oxide, indium zinc oxide including tungsten oxide, indium oxide including titanium oxide, indium tin oxide including titanium oxide, indium tin oxide (hereinafter referred to as ITO), indium zinc oxide, or indium tin oxide to which silicon oxide is added can be used.

As a reflective conductive material which can be used for the pixel electrode layer 4030 and the first common electrode layer 4051, for example, one or plural kinds of materials selected from metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy thereof; and a nitride thereof can be used.

A conductive composition including a conductive macromolecule (also referred to as a conductive polymer) can be used for the pixel electrode layer 4030, the first common electrode layer 4051, and the second common electrode layer 4031.

For the liquid crystal layer 4008 of the liquid crystal element 4013, polymer dispersed liquid crystal (PDLC) is used. Alternatively, polymer network liquid crystal (PNLC) may be used. The liquid crystal layer 4008 may be formed using a material and a method similar to those of the liquid crystal layer 208 described in Embodiment 1.

In the liquid crystal layer 4008, when voltage is not applied between the pixel electrode layer 4030, and the first common electrode layer 4051 and the second common electrode layer 4031, incident light is scattered by liquid crystal grains dispersed in a polymer layer and the liquid crystal layer 4008 is opaque and clouded; thus, white display is performed. On the other hand, when voltage is applied between the pixel electrode layer 4030, and the first common electrode layer 4051 and the second common electrode layer 4031, an electric field is generated in the liquid crystal layer 4008, liquid crystal molecules in the liquid crystal grains are oriented in the direction of the electric field, and incident light is transmitted through the liquid crystal layer 4008. As a result, the liquid crystal layer 4008 is in a transparent state and the pixel electrode layer 4030 transmits light; thus, a black layer 4021 under the liquid crystal layer 4008 can be seen on a display screen.

In this embodiment, the black layer 4021 is provided and thus black display is performed; however, if a layer exhibiting a chromatic color such as a red layer, a green layer, or a blue layer is used instead of the black layer 4021, display of the chromatic color can be performed.

A structure body 4052 is provided over one of the common electrode layers (in this embodiment, the first common electrode layer 4051 provided over the first substrate 4001) so as to project into the liquid crystal layer 4008 and the pixel electrode layer 4030 is provided over the structure body 4052, whereby the pixel electrode layer 4030 can be positioned in the liquid crystal layer 4008.

By providing the pixel electrode layer 4030 in the center of the liquid crystal layer 4008 sandwiched between the first common electrode layer 4051 and the second common electrode layer 4031, a structure in which the following two optical elements are stacked can be obtained: a first liquid crystal element including the first common electrode layer 4051, the liquid crystal layer 4008, and the pixel electrode layer 4030; and a second liquid crystal element including the pixel electrode layer 4030, the liquid crystal layer 4008, and the second common electrode layer 4031.

In the liquid crystal layer 4008, the liquid crystal layer 4008 positioned between the first common electrode layer 4051 and the pixel electrode layer 4030 is controlled by an electric field generated between the first common electrode layer 4051 and the pixel electrode layer 4030. The liquid crystal layer 4008 positioned between the pixel electrode layer 4030 and the second common electrode layer 4031 is controlled by an electric field generated between the pixel electrode layer 4030 and the second common electrode layer 4031. Since the thickness of the liquid crystal layer 4008 can be increased by stacking the first liquid crystal element and the second liquid crystal element, a high light scattering effect can be obtained and favorable white display can be performed. Further, the first liquid crystal element and the second liquid crystal element are parallel to each other in a circuit; thus, voltage for driving both the first liquid crystal element and the second liquid crystal element can be the same as voltage for driving one of the first liquid crystal element and the second liquid crystal element.

Therefore, even when the thickness of the liquid crystal layer 4008 is increased for favorable white display, the liquid crystal molecules can be made to respond without increase in the driving voltage of the liquid crystal elements. Consequently, in the liquid crystal display device, improvement in contrast ratio and reduction in power consumption can be achieved.

A liquid crystal display device having higher visibility and image quality can be provided.

As described above, since liquid crystals are not aligned in advance and incident light is not polarized in the case of using polymer dispersed liquid crystal, an alignment film and a polarizing plate are not necessarily provided.

Accordingly, since an alignment film and a polarizing plate are not provided in a liquid crystal display device using polymer dispersed liquid crystal, light is not absorbed by the alignment film and the polarizing plate; thus, a bright display screen with higher luminance can be obtained. High light use efficiency leads to reduction in power consumption of the liquid crystal display device. Steps and cost for providing the alignment film and the polarizing plate can be reduced, and thus higher throughput and lower cost can be realized. In addition, rubbing treatment is unnecessary because an alignment film is not provided; accordingly, dielectric breakdown caused by the rubbing treatment can be prevented and defects and damage of the liquid crystal display device can be reduced in the manufacturing process. Thus, the liquid crystal display device can be manufactured with high yield and productivity thereof can be improved. A transistor particularly has a possibility that electric characteristics of the transistor may fluctuate significantly owing to static electricity and deviate from the design range. Therefore, it is effective to use a polymer dispersed liquid crystal material for a liquid crystal display device including a transistor.

For the first substrate 4001 and the second substrate 4006, glass, plastic, or the like having a light-transmitting property can be used. As plastic, a fiberglass-reinforced plastics (FRP) plate, a polyvinyl fluoride (PVF) film, a polyester film, or an acrylic resin film can be used. In addition, a sheet with a structure in which an aluminum foil is sandwiched between PVF films or polyester films can be used.

A columnar spacer denoted by reference numeral 4035 is obtained by selective etching of an insulating film and is provided in order to control the thickness (a cell gap) of the liquid crystal layer 4008. Alternatively, a spherical spacer may be used. In the liquid crystal display device including the liquid crystal layer 4008, the cell gap which is a thickness of the liquid crystal layer may be greater than or equal to 5 μm and less than or equal to 30 μm (preferably greater than or equal to 10 μm and less than or equal to 20 μm.

The transistor may be covered with an insulating layer 4020 and an insulating layer 4041 which function as protective films; however, one embodiment of the invention disclosed in this specification is not particularly limited to the structure. In this embodiment, an insulating layer 4023 is provided over the black layer 4021.

Note that the protective film is provided to prevent entry of contaminant impurities such as an organic substance floating in the air, metal, or moisture and is preferably a dense film. The protective film may be formed by a sputtering method to have a single-layer structure or a stacked-layer structure using any of a silicon oxide film, a silicon nitride film, a silicon oxynitride film, a silicon nitride oxide film, an aluminum oxide film, an aluminum nitride film, an aluminum oxynitride film, and an aluminum nitride oxide film.

Further, in the case of further forming a light-transmitting insulating layer as a planarization insulating film, the light-transmitting insulating layer can be formed using an organic material having heat resistance, such as polyimide, acrylic, benzocyclobutene, polyamide, or epoxy. Other than such organic materials, it is also possible to use a low-dielectric constant material (a low-k material), a siloxane-based resin, phosphosilicate glass (PSG), borophosphosilicate glass (BPSG), or the like. Note that the insulating layer may be formed by stacking plural insulating films formed using any of these materials.

There is no particular limitation on the method for forming the insulating layer having a stacked-layer structure, and the following method can be employed depending on the material: a sputtering method, spin coating, dip coating, spray coating, a droplet discharging method (such as an ink-jet method, screen printing, or offset printing), roll coating, curtain coating, knife coating, or the like.

An optical member (an optical substrate) or the like may be provided as appropriate in the liquid crystal display device.

Further, since the transistor is easily broken by static electricity or the like, a protection circuit for protecting the driver circuits is preferably provided over the same substrate for a gate line or a source line. The protection circuit is preferably formed using a nonlinear element.

In this manner, in the liquid crystal display device, improvement in contrast ratio and reduction in power consumption can be achieved.

This embodiment can be implemented in an appropriate combination with any of the structures described in the other embodiments.

Embodiment 9

A liquid crystal display device disclosed in this specification can be applied to a variety of electronic devices. In particular, the liquid crystal display device disclosed in this specification, in which white is displayed by light scattering and which has high image quality like a plane of paper, is eye-friendly and can be favorably used as electronic paper. Electronic paper can be used for electronic devices of a variety of fields as long as they can display information. For example, electronic paper can be applied to an electronic book reader (an e-book reader), a poster, an advertisement in a vehicle such as a train, displays of various cards such as a credit card, and the like.

The liquid crystal display device disclosed in this specification may be applied to another electronic device such as a digital photo frame or a mobile phone (also referred to as a cellular phone or a mobile phone device). Examples of electronic devices each including the liquid crystal display device described in the above embodiment will be described.

Figure 14A:
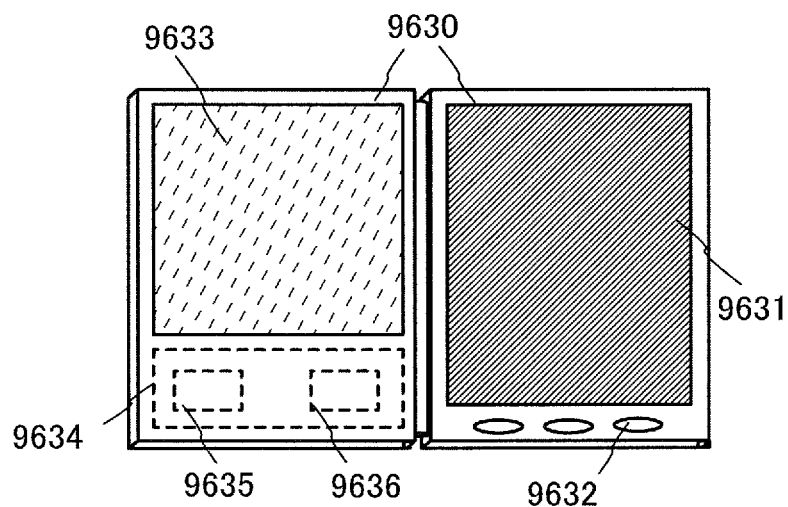
FIGS. 14A and 14B illustrate an electronic device.

FIG. 14A illustrates an electronic book reader (also referred to as an e-book reader) which can include housings 9630, a display portion 9631, operation keys 9632, a solar cell 9633, and a charge and discharge control circuit 9634. The electronic book reader illustrated in FIG. 14A has a function of displaying various kinds of information (such as a still image, a moving image, and a text image) on the display portion, a function of displaying a calendar, a date, the time, or the like on the display portion, a function of operating or editing the information displayed on the display portion, a function of controlling processing by various kinds of software (programs), and the like. Note that in FIG. 14A, the charge and discharge control circuit 9634 has a battery 9635 and a DCDC converter (hereinafter abbreviated as a converter) 9636 as an example. When the liquid crystal display device described in any of Embodiments 1 to 3 is applied to the display portion 9631, an electronic book reader with favorable visibility and low power consumption can be provided.

In the case where a reflective liquid crystal display device is used as the display portion 9631, use under a relatively bright condition is assumed; therefore, the structure illustrated in FIG. 14A is preferable because power generation by the solar cell 9633 and charge in the battery 9635 can be efficiently performed. Since the solar cell 9633 can be provided in an unoccupied space (a surface or a rear surface) of the housing 9630 as appropriate, the battery 9635 can be efficiently charged, which is preferable. When a lithium ion battery is used as the battery 9635, there is an advantage of downsizing or the like.

Figure 14B:
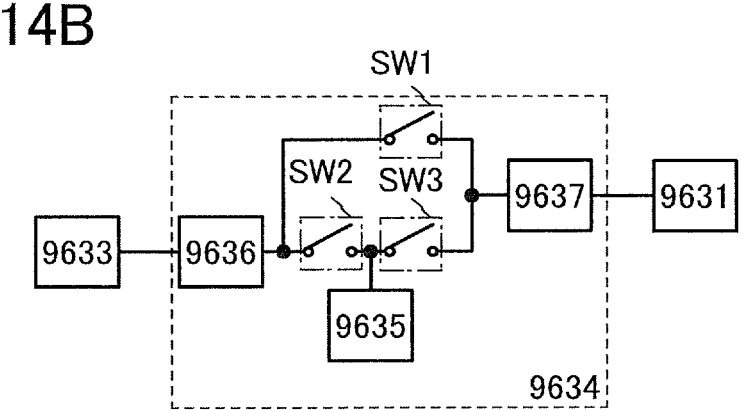

The structure and operation of the charge and discharge control circuit 9634 illustrated in FIG. 14A are described with reference to a block diagram in FIG. 14B. The solar cell 9633, the battery 9635, the converter 9636, a converter 9637, switches SW1 to SW3, and the display portion 9631 are illustrated in FIG. 14B, and the battery 9635, the converter 9636, the converter 9637, and the switches SW1 to SW3 correspond to the charge and discharge control circuit 9634.

First, an example of operation in the case where power is generated by the solar cell 9633 with the use of outside light is described. The voltage of power generated by the solar cell is raised or lowered by the converter 9636 so that the power has voltage for charging the battery 9635. Then, when the power from the solar cell 9633 is used for the operation of the display portion 9631, the switch SW1 is turned on and the voltage of the power is raised or lowered by the converter 9637 so as to be voltage needed for the display portion 9631. When display on the display portion 9631 is not performed, the switch SW1 is turned off and the switch SW2 is turned on so that charge of the battery 9635 may be performed.

Next, an example of operation in the case where power is not generated by the solar cell 9633 with the use of outside light is described. The voltage of power accumulated in the battery 9635 is raised or lowered by the converter 9637 by turning on the switch SW3. Then, power from the battery 9635 is used for the operation of the display portion 9631.

Note that although the solar cell 9633 is described as an example of a means for charge, charge of the battery 9635 may be performed with another means. In addition, a combination of the solar cell 9633 and another means for charge may be used.

Figure 15A:
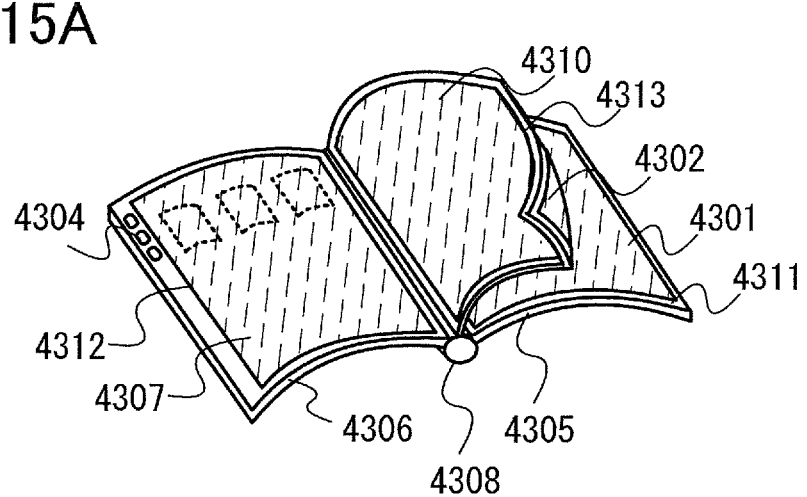
FIGS. 15A and 15B illustrate an electronic device.
Figure 15B:
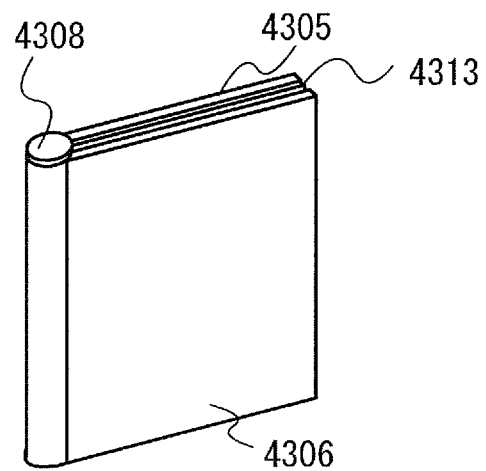

FIGS. 15A and 15B illustrate an example of a flexible electronic book reader to which a liquid crystal display device manufactured according to the above embodiment is applied. FIG. 15A illustrates an opened electronic book reader, and FIG. 15B illustrates a closed electronic book reader. The liquid crystal display device manufactured according to the above embodiment can be used for a first display panel 4311, a second display panel 4312, and a third display panel 4313. By application of the liquid crystal display device in which white is displayed by light scattering, the electronic book reader can have higher visibility and lower power consumption.

A first housing 4305 has the first display panel 4311 including a first display portion 4301, and a second housing 4306 has the second display panel 4312 including an operation portion 4304 and a second display portion 4307. The third display panel 4313 is a double-sided display panel and includes a third display portion 4302 and a fourth display portion 4310. The third display panel 4313 is interposed between the first display panel 4311 and the second display panel 4312. The first housing 4305, the first display panel 4311, the third display panel 4313, the second display panel 4312, and the second housing 4306 are connected to each other with a binding portion 4308 in which a driver circuit is provided. The electronic book reader in FIG. 15A includes four display screens: the first display portion 4301, the second display portion 4307, the third display portion 4302, and the fourth display portion 4310.

The first housing 4305, the first display panel 4311, the third display panel 4313, the second display panel 4312, and the second housing 4306 are flexible, and thus the flexibility of the electronic book reader is high. Further, when a plastic substrate is used for each of the first housing 4305 and the second housing 4306, and a thin film is used for the third display panel 4313, a thin electronic book reader can be obtained.

The third display panel 4313 is the double-sided display panel including the third display portion 4302 and the fourth display portion 4310. One-side emission type display panels bonded to each other may be used as the third display panel 4313. Further, the third display panel 4313 may be omitted so that a two-page electronic book reader is obtained.

This embodiment can be implemented in an appropriate combination with any of the structures described in the other embodiments.

This application is based on Japanese Patent Application serial no. 2010-116014 filed with Japan Patent Office on May 20, 2010, the entire contents of which are hereby incorporated by reference.

What is claimed is:

1. A liquid crystal display device comprising:
a first substrate;
a second substrate;
a liquid crystal layer sandwiched between the first substrate and the second substrate, the liquid crystal layer comprising a polymer dispersed liquid crystal material;
a first common electrode layer provided between the first substrate and the liquid crystal layer;
a second common electrode layer provided between the second substrate and the liquid crystal layer, the second common electrode layer having a light-transmitting property; and
a structure body and a pixel electrode layer that comprise an opening and are stacked between the first common electrode layer and the liquid crystal layer,
wherein the first common electrode layer overlaps with the opening, and
wherein in the liquid crystal layer, the pixel electrode layer is positioned between the first common electrode layer and the second common electrode layer by the structure body.

2. The liquid crystal display device according to claim 1, wherein the pixel electrode layer has reflectivity.

3. The liquid crystal display device according to claim 1, wherein the pixel electrode layer has a light-transmitting property.

4. The liquid crystal display device according to claim 1, further comprising a transistor between the first substrate and the first common electrode layer,
   wherein the transistor is electrically connected to the pixel electrode layer.

5. A liquid crystal display device comprising:
   a first substrate;
   a second substrate;
   a liquid crystal layer sandwiched between the first substrate and the second substrate, the liquid crystal layer comprising a polymer dispersed liquid crystal material;
   a first common electrode layer provided between the first substrate and the liquid crystal layer, the first common electrode layer having a light-transmitting property;
   a second common electrode layer provided between the second substrate and the liquid crystal layer, the second common electrode layer having a light-transmitting property;
   a structure body and a pixel electrode layer that comprise an opening and are stacked between the first common electrode layer and the liquid crystal layer, and
   a coloring layer provided between the first substrate and the first common electrode layer,
   wherein the first common electrode layer overlaps with the opening, and
   wherein in the liquid crystal layer, the pixel electrode layer is positioned between the first common electrode layer and the second common electrode layer by the structure body.

6. The liquid crystal display device according to claim 5, wherein the coloring layer is a black layer.

7. The liquid crystal display device according to claim 5, wherein the pixel electrode layer has reflectivity.

8. The liquid crystal display device according to claim 5, wherein the pixel electrode layer has a light-transmitting property.

9. The liquid crystal display device according to claim 5, further comprising a transistor between the first substrate and the first common electrode layer,
   wherein the transistor is electrically connected to the pixel electrode layer.

10. A liquid crystal display device comprising:
    a first substrate;
    a first common electrode layer over the first substrate;
    a structure body over the first common electrode layer;
    a pixel electrode layer over the structure body;
    a second common electrode layer over the pixel electrode layer;
    a liquid crystal layer sandwiched between the first common electrode layer and the second common electrode layer; and
    a second substrate over the second common electrode layer,
    wherein the structure body and the pixel electrode layer comprise an opening, and
    wherein the first common electrode layer overlaps with the opening.

11. The liquid crystal display device according to claim 10, wherein the structure body and the pixel electrode layer comprise an opening.

12. The liquid crystal display device according to claim 10, wherein the first common electrode layer and the second common electrode layer have a light-transmitting property.

13. The liquid crystal display device according to claim 10, wherein the pixel electrode layer has reflectivity.

14. The liquid crystal display device according to claim 10, wherein the pixel electrode layer has a light-transmitting property.

15. The liquid crystal display device according to claim 10, further comprising a transistor between the first substrate and the first common electrode layer,
    wherein the transistor is electrically connected to the pixel electrode layer.

* * * * *